(12) United States Patent
Marcu et al.

(10) Patent No.: US 10,642,513 B2
(45) Date of Patent: May 5, 2020

(54) PARTIALLY DE-CENTRALIZED LATCH MANAGEMENT ARCHITECTURES FOR STORAGE DEVICES

(71) Applicant: SanDisk Technologies LLC, Plano, TX (US)

(72) Inventors: Alon Marcu, Tel Mond (IL); Judah Gamliel Hahn, Ofra (IL); Gadi Vishne, Petah Tikva (IL); Alex Bazarsky, Holon (IL); Ariel Navon, Revava (IL)

(73) Assignee: SanDisk Technologies LLC, Plano ( * ) Notice: Subject to any disclaimer, the term of this patent is extended or adjusted under 35 U.S.C. 154(b) by 0 days.

(21) Appl. No.: 15/899,142

(22) Filed: Feb. 19, 2018

(65) Prior Publication Data

US 2018/0173444 A1    Jun. 21, 2018

Related U.S. Application Data

(63) Continuation-in-part of application No. 14/928,188, filed on Oct. 30, 2015, now Pat. No. 10,025,532.

(30) Foreign Application Priority Data

Sep. 11, 2015    (IN) ............................ 4837/CHE/2015

(51) Int. Cl.
    *G06F 3/06*    (2006.01)
(52) U.S. Cl.
    CPC .......... *G06F 3/0626* (2013.01); *G06F 3/0658* (2013.01); *G06F 3/0659* (2013.01); *G06F 3/0679* (2013.01)

(58) Field of Classification Search
    CPC ..... G06F 3/0659; G06F 3/0679; G06F 3/0604
    See application file for complete search history.

(56) References Cited

U.S. PATENT DOCUMENTS

| | | | |
|---|---|---|---|
| 5,854,943 A | 12/1998 | McBride et al. | |
| 6,163,501 A | 12/2000 | Ohshima et al. | |
| 6,469,955 B1 | 10/2002 | Tsao et al. | |
| 6,516,389 B1 | 2/2003 | Uchihori | |
| 7,173,863 B2 | 2/2007 | Conley et al. | |
| 7,408,834 B2 | 8/2008 | Conley et al. | |
| 8,634,248 B1 | 1/2014 | Sprouse et al. | |
| 8,725,931 B1 * | 5/2014 | Kang | G06F 12/0246 710/52 |
| 8,732,406 B1 | 5/2014 | Pase et al. | |
| 8,861,269 B2 | 10/2014 | Chen et al. | |
| 9,053,820 B2 | 6/2015 | Chen et al. | |
| 9,431,120 B1 | 8/2016 | Tuers et al. | |
| 9,678,832 B2 | 6/2017 | Tuers et al. | |
| 2005/0195636 A1 | 9/2005 | Conley et al. | |

(Continued)

*Primary Examiner* — Tasnima Matin
(74) *Attorney, Agent, or Firm* — Dickinson Wright PLLC; Steven Hurles

(57) ABSTRACT

A storage device may utilize de-centralized latch management to remove functions from the device controller to the memory die. NAND die located on a common bus may share a pool of latches with one die acting as a proxy or manager for the other die. A bridge or bridges may be used between NAND connections to allow additional die to be controlled by a leader die for the partially de-centralized management of latches. The latch management operations may include a sequence of commands/operations performed by the leader die.

22 Claims, 18 Drawing Sheets

(56) References Cited

U.S. PATENT DOCUMENTS

| | | |
|---|---|---|
| 2005/0286284 A1 | 12/2005 | See et al. |
| 2008/0183903 A1 | 7/2008 | VanStee et al. |
| 2008/0270706 A1 | 10/2008 | Fair et al. |
| 2010/0306421 A1 | 12/2010 | Maeda et al. |
| 2011/0197107 A1* | 8/2011 | Ou .................. G06F 11/1004 714/758 |
| 2012/0195136 A1* | 8/2012 | Yoko ..................... G11C 5/04 365/189.07 |
| 2013/0279254 A1 | 10/2013 | Kamata et al. |
| 2014/0223073 A1 | 8/2014 | Benisty et al. |
| 2014/0244864 A1 | 8/2014 | Shiga |
| 2014/0344505 A1 | 11/2014 | Lim |
| 2015/0302915 A1* | 10/2015 | Park .................. G11C 11/4093 365/189.05 |
| 2016/0054931 A1 | 2/2016 | Romanovsky et al. |
| 2016/0054934 A1 | 2/2016 | Hahn et al. |
| 2016/0246726 A1 | 8/2016 | Hahn |
| 2019/0146884 A1* | 5/2019 | Gangadharappa .. G06F 11/1469 711/162 |

* cited by examiner

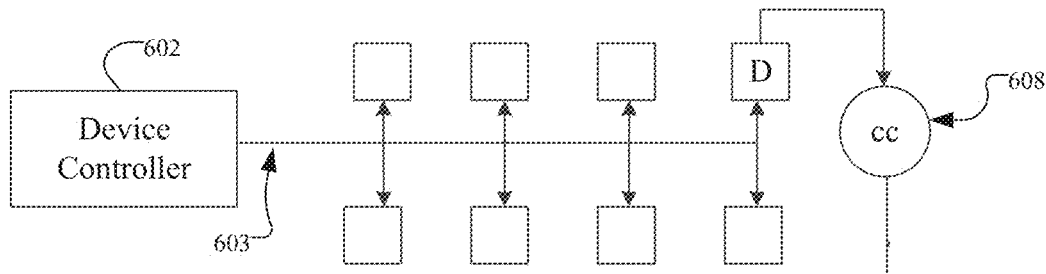
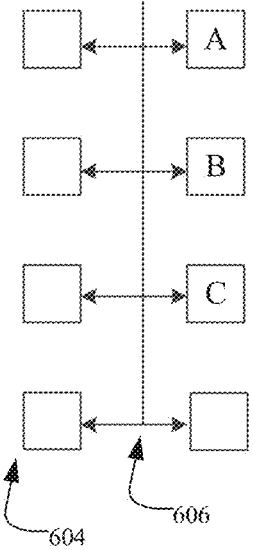
Figure 6a
Figure 6b
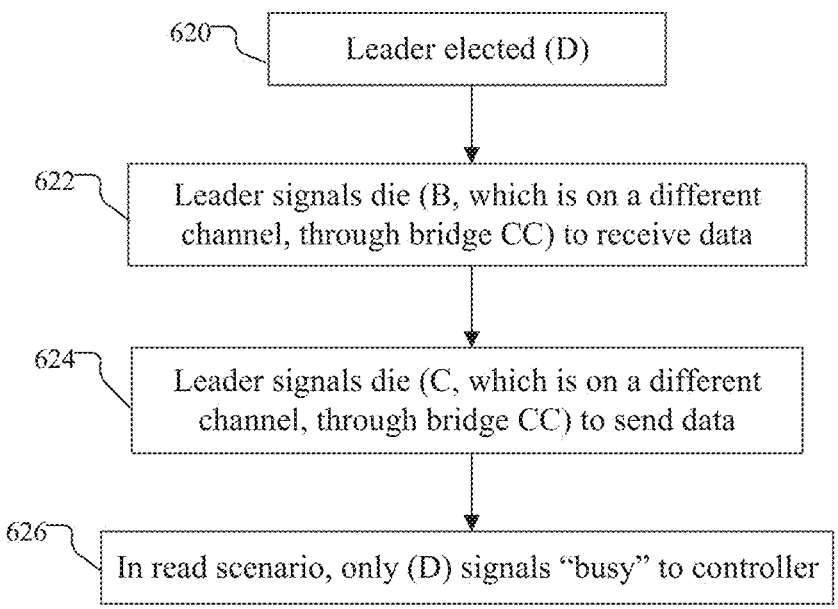

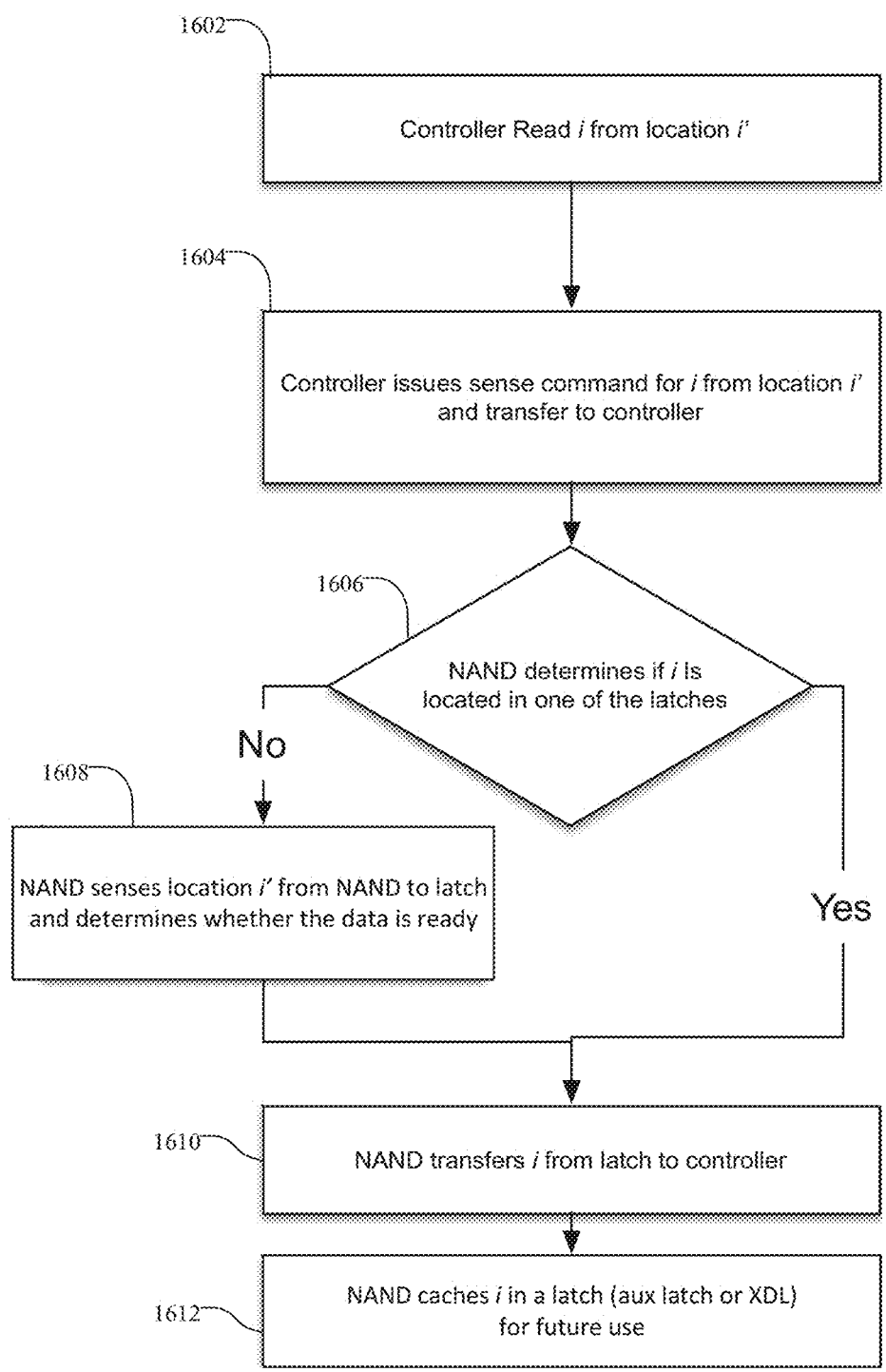

US 10,642,513 B2

PARTIALLY DE-CENTRALIZED LATCH MANAGEMENT ARCHITECTURES FOR STORAGE DEVICES

PRIORITY

This application claims priority as a continuation-in-part to U.S. application Ser. No. 14/928,188, filed on Oct. 30, 2015, entitled "PRESERVING READ LOOK AHEAD DATA IN AUXILIARY LATCHES," which claims priority to India Patent Application No. 4837/CHE/2015, filed on Sep. 11, 2015, entitled "PRESERVING READ LOOK AHEAD DATA IN AUXILIARY LATCHES," the entire disclosure of each are herein incorporated by reference.

TECHNICAL FIELD

This application relates generally to memory devices. More specifically, this application relates to a memory controller that partially manages NAND dies.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. As the non-volatile memory cell scales to smaller dimensions with higher capacity per unit area, the cell endurance due to program and erase cycling, and disturbances (e.g. due to either read or program) may become more prominent. The overall vulnerability of memory cells and the defect level during the silicon process may become elevated as the cell dimension shrinks and process complexity increases, which directly affects the data integrity and performance at both the memory and system. Management of latches in a NAND die may require a balancing of reducing load on the controller while simplifying NAND logic design.

SUMMARY

A storage device may utilize de-centralized latch management to remove functions from the device controller to the memory die. NAND die located on a common bus may share a pool of latches with one die acting as a proxy or manager for the other die. A bridge or bridges may be used between NAND connections to allow additional die to be controlled by a leader die for the partially de-centralized management of latches. The latch management operations may include a sequence of commands/operations performed by the leader die.

A storage device may utilize latches for storage. In one example, there may be auxiliary or spare latches, which are used as a cache for storing pre-fetch data. The embodiments described below may reduce or eliminate complexity for managing the latches. In various embodiments, the controller may manage the latches or that management may be through each individual NAND di. As described below, the storage device may have several embodiments for at least partially de-centralizing latch management from the controller. For example, individual NAND dies that are located on the same NAND bus (i.e. NAND channel) may be configured to cooperate with one another to share a pool of latches by using a leader die concept. The leader die acts as a proxy for the other die on a NAND bus. In another embodiment, the die can handle the latch status and data transfers between dies residing on the same bus.

BRIEF DESCRIPTION OF THE DRAWINGS

FIG. 6a is a block diagram of a partially de-centralized latch architecture with a depth bus extension.

FIG. 6b is a flow chart of a process for managing a partially de-centralized latch architecture with a depth bus extension.

FIG. 16 is a flow chart of another NAND based embodiment for transferring of data using latches as cache.

DESCRIPTION OF THE EMBODIMENTS

Figure 1A:
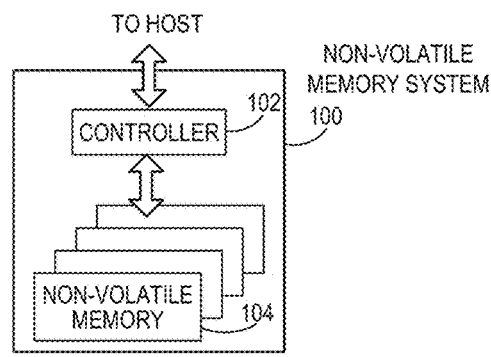
FIG. 1A is a block diagram of an example non-volatile memory system.

In a centralized latch management system, commands and data are sent from or received by the controller. The commands/data may pass through the NAND bus to the NAND dies, which are connected to the bus. In this centralized system, the controller may be aware of the status of each of the die latches occupancy (no data, valid data, obsolete data, etc.). If data is to be transferred from one latch to another in the same die, it may be done by a command sent from the controller. If data is to be transferred from one latch to another in different die (same NAND bus or not), it may be done through the controller and that data is transferred on the bus. This centralized design may result in a heavy load on the controller and the NAND bus.

Rather than being centralized, the latch management may be fully or partially de-centralized (or referred to as partially centralized). In a fully de-centralized latch management system, the controller may not be aware of what data is stored inside the die latch. The die handles its own data and its validity. The data can be moved from one latch to another inside the same die without controller involvement. When data has to be transferred from a latch in one die to a latch in another die, then the data is transferred on the bus with controller involvement. Fully de-centralized may be simpler system design with better utilization of latches inside the NAND, but may require more complex NAND logic design, such as a latch cache manager inside each NAND.

In one example of fully de-centralized latch management, a storage device may utilize auxiliary or spare latches as a cache for storing pre-fetch data. The embodiments described below may reduce or eliminate complexity for predetermining a cache mode or a non-cache mode. Data may be cached in latches as a way to improve sensing operations. When a read command is sent to the same physical block and the data is already stored in the latch, the data in the latch may be automatically identified and transferred back to the controller without another sensing operation. The NAND may include caching logic that automatically detects whether the data is already transferred without performing a send and for determining which data has been cached and selecting sense operations that can be skipped as part of a read command. Data may be cached in latches as a way to improve sensing operations. When a read command is sent to the same physical block and the data is already stored in the latch, the data in the latch may be automatically identified and transferred back to the controller without another sensing operation. The NAND may include caching logic that automatically detects whether the data is already transferred without performing a send and for determining which data has been cached and selecting sense operations that can be skipped as part of a read command.

A storage device utilizing read look ahead (RLA) may utilize auxiliary or spare latches as a RLA cache for storing pre-fetch data. The RLA may predict the next commands and do a speculative read to the flash using the latches for RLA storage. The auxiliary/spare latches may be present on a plane or die of non-volatile memory and may be different from the transfer data latch (XDL) that transfers data from the memory and the host. Using RAM or DDR for the RLA cache may not allow the memory to utilize hardware automation/acceleration techniques, which may provide improved performance. Using the spare/auxiliary latches for the RLA cache allows for hardware automation to be maintained. The sense and transfer components of a read command may be broken up such that a sense command may be performed to read the data and the data is stored in an auxiliary latch until the transfer (from the XDL) is ready.

For fully de-centralized latch management, a sense time bottleneck may be improved by keeping data cached in latches and performing pre-emptive (or read ahead) sensing, or sensing in several dies in parallel. When a read command is sent to the same physical block and the data is already stored in the latch, the data in the latch is automatically identified and transferred back to the controller without another sensing operation. The memory (e.g. NAND) may skip the sense operation of a read command and only use the transfer operation. Data may be cached in latches as a way to improve sensing operations. When a read command is sent to the same physical block and the data is already stored in the latch, the data in the latch may be automatically identified and transferred back to the controller without another sensing operation. In other words, a read operation automatically detects whether the data is already transferred without performing a send. For NAND memory, it may be the NAND rather than the controller that includes caching logic for determining which data has been cached and selecting sense operations that can be skipped as part of a read command.

Host hints and cluster associations may be exploited to perform data pre-fetches. The data pre-fetches may also be referred to as read look ahead (RLA), and may result in reads to different dies or threads. RLA may be a mechanism for anticipating the next command that is going to come from the host which can be used to reduce the turn-around times on multiple commands. RLA may include a speculative read to flash when predicting the logical block address (LBA) range for the next command coming from the host. The detection of a sequence for predicting the next command may be performed by an algorithm that considers sequences (e.g. for a file transfer) or other methods of predicting commands. As described below, when the next commands are identified, a pre-sense is performed and an RLA cache (e.g. spare/auxiliary latches) is used for storing that information rather than relying on random access memory (RAM).

The RLA cache allows data that may be requested by a host to be stored in cache before a request is actually made by the host for that data. As described, the latches (described with respect to FIGS. 3-6) may be used a read look ahead cache. Where a host requests data having a particular logical block address (LBA) range, additional data having a LBA range that is sequential to the requested data may be stored in the latches. Because a host may frequently request data that is logically sequential to the last requested data, there is a higher probability that the stored data will be requested. RLA data may also be selected in other ways based on host data usage patterns. If the latch data is subsequently requested, it may be transferred directly from the latch to the host, such as through the transfer data latch (XDL), but without accessing the memory. This transfer may be quicker than a transfer from the memory and does not require use of the memory bus. Thus, the memory bus may be used for other operations while data is being transferred to the host. If a random read arrives in the middle of a data pre-fetch, the effort spent on the RLA may be wasted since the pre-fetch data has to be discarded. In order to avoid discarding those pre-fetches, that pre-fetch data may be loaded onto idle or unused latches on a memory plane by moving it from the transfer latch to the spare latches which prevents the RLA data from being lost. Even before the host asks for the data, it may be ready in parallel paths which lead to a boost in performance. The loading of pre-fetch data may be most efficient with mixed traffic loads in a multi-threaded system where the dies may tend to remain idle for a long time because the bus is busy with longer sequential reads/writes. The idle dies may have data that the host anticipates ready to go in the spare latches. That data may be provided once the existing transfer is completed and the host requests that data.

FIGS. 1A-2B are exemplary memory systems which may implement using latches as an RLA cache. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
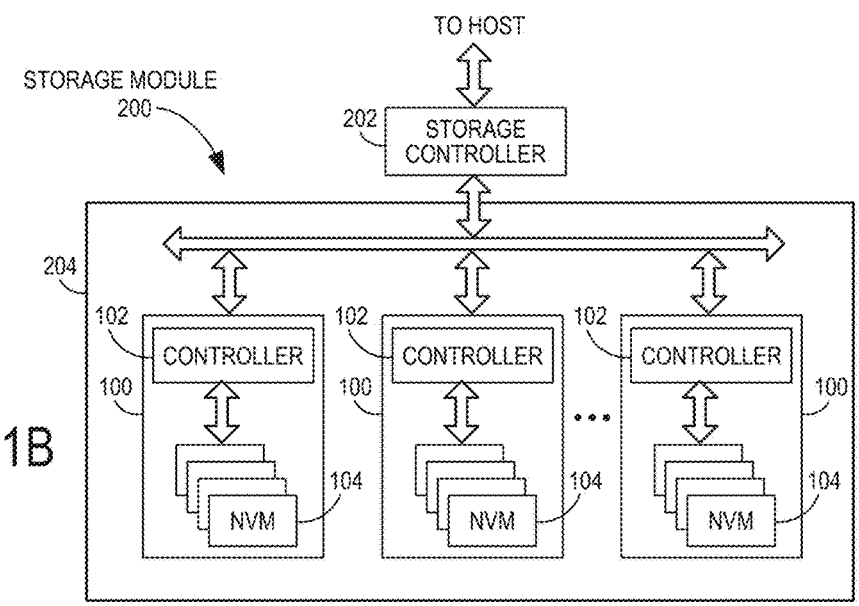
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
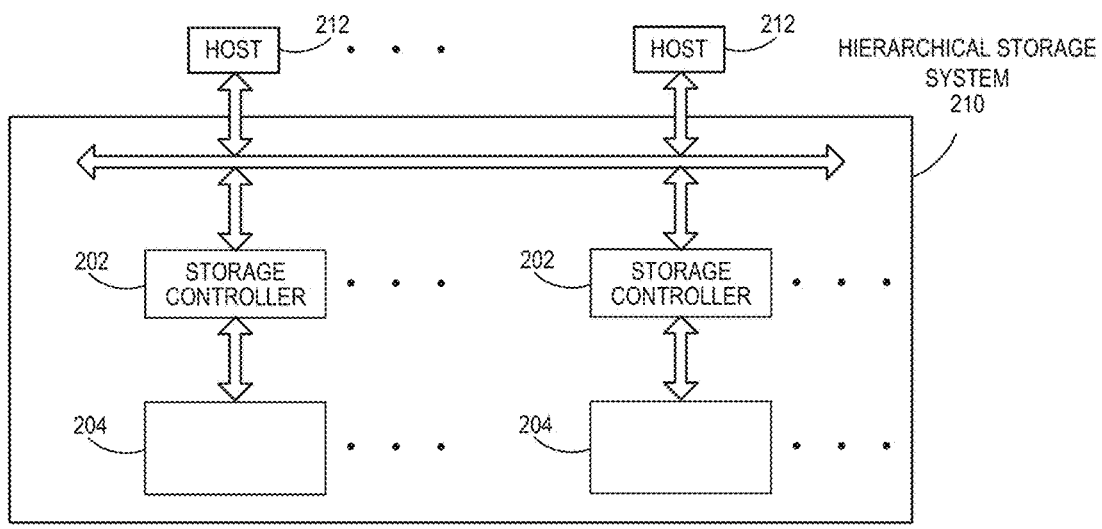
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
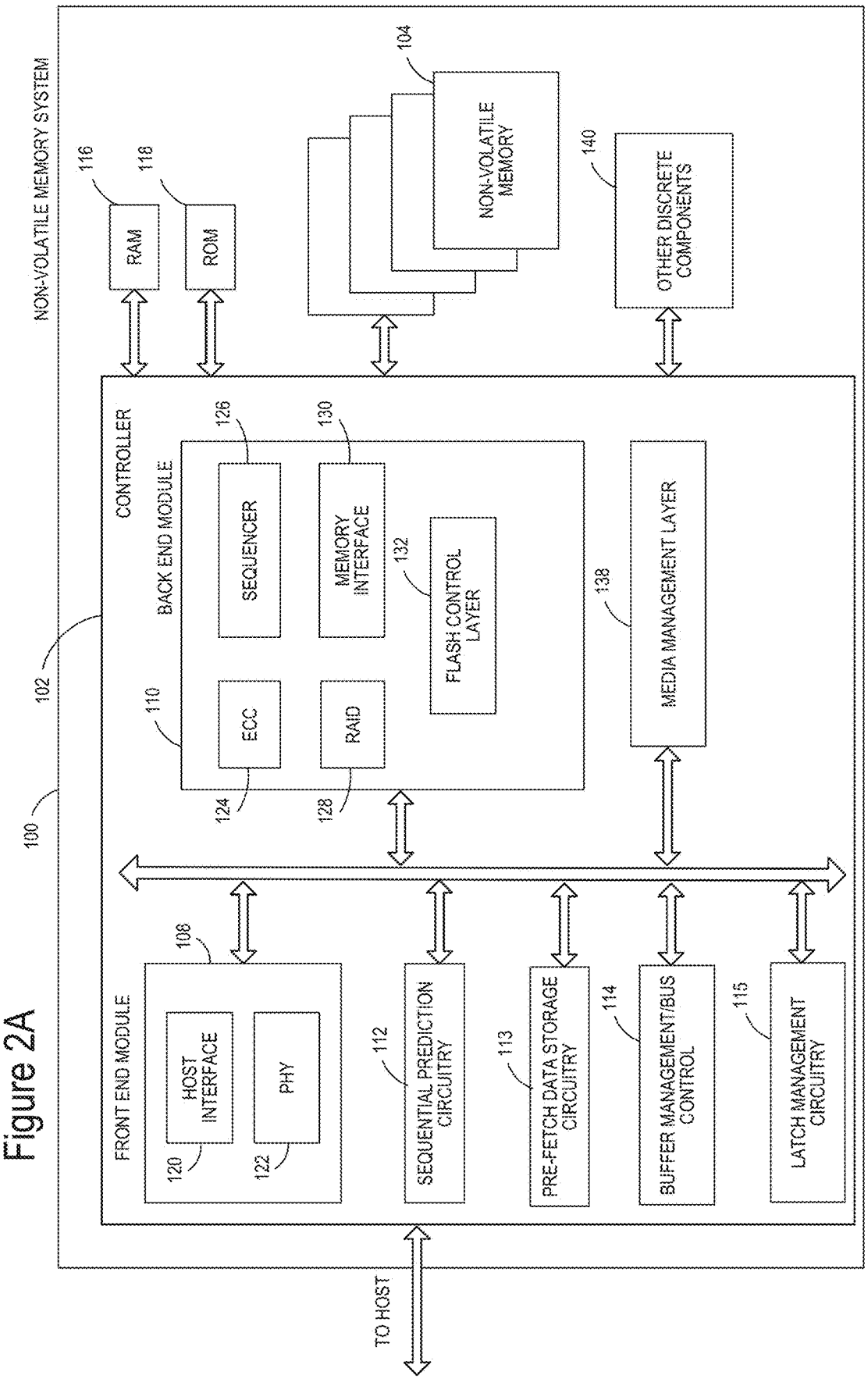
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module. A module may also be referred to as circuitry.

The controller 102 may include sequential prediction circuitry 112 and may include pre-fetch data storage circuitry 113. The sequential prediction circuitry 112 may be used for identifying data to be pre-fetched as part of a read look ahead (RLA) process. The sequential prediction circuitry 112 may include an algorithm for identifying a sequence of data such that future data requests may be predicted based on the sequence. In alternative embodiments, the data may not be a sequence, but the sequential prediction circuitry 112 may be able to predict future commands from the host. Based on the predictions from the sequential prediction circuitry 112, the pre-fetch data storage circuitry 113 may pre-fetch for the predicted commands. As described herein, the pre-fetch data storage circuitry 113 may utilize auxiliary latches of the memory for storing the pre-fetched data. The auxiliary latches may not be used otherwise, and storage in the RAM 116 or DDR may not allow the memory to utilize hardware automation techniques. Using hardware automated read paths may provide improved performance that can be maintained when utilizing unused latches for RLA rather than DDR.

Hardware automation may include using a fixed read pipeline that accepts a given set of physical addresses relative to a set of dies. It may deliver the contents directly to host memory using a fixed workflow, which will stop if an error or an unexpected action occurs and then deliver control back to the device firmware. There may be an underlying assumption in a hardware automated pipeline that the data to be delivered to the host is present in non-volatile memory and that a given sequence of commands can be used to retrieve it. Redirection of the workflow to fetch selected data from DDR may require firmware intervention to determine the addresses and manage the volatile memory, and thus it may not be fully automated. Retrieving preloaded data may merely involve changing the sequence sent to the NAND during the read (the preload occurs out of the context of the automated read itself) and thus can still utilize the automated read workflow.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Figure 2B:
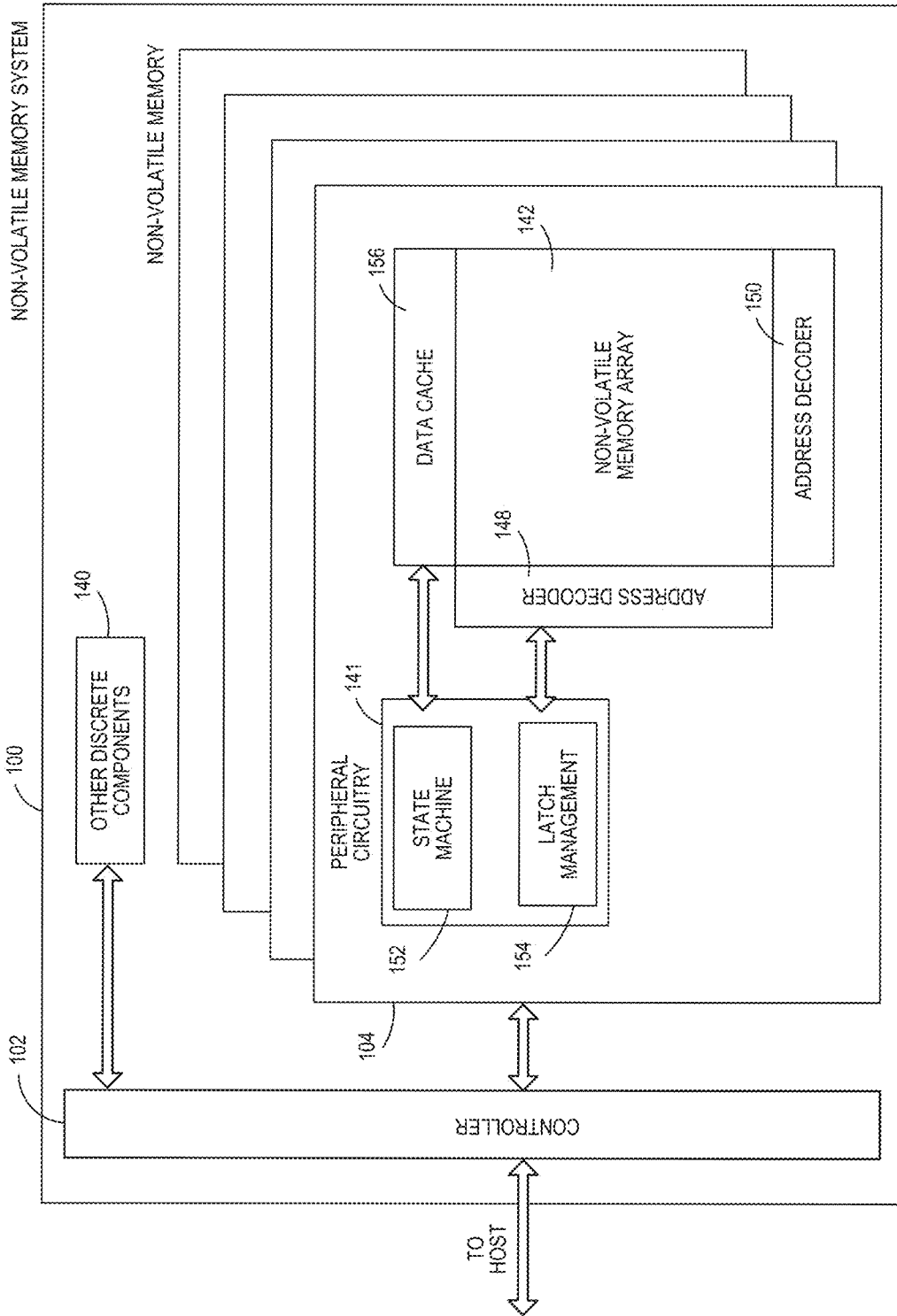
FIG. 2B is a block diagram of exemplary components of a non-volatile memory of a non-volatile memory storage system.

Latch management circuitry 115 may manage the temporary storage or caching of latches of various memory die. Although shown as circuitry within the controller 102, the latch management circuitry may be placed in the dies of the non-volatile memory 104. Specifically, FIGS. 5a-8b describe selection of a leader memory die that manages latch storage rather than requiring the latch management circuitry 115 of the controller 102 to handle all data transfer to/from the latches. FIG. 2b further describes latch management as part of the memory.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and may be arranged in planes. In one embodiment, each non-volatile memory die 104 may include one or more planes. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. Exemplary peripheral circuitry 141 may include clocks, pumps, ESD, current shunt, current sink, and/or closely-packed logic circuits.

The non-volatile memory 104 may comprise memory dies with latches. Management of those latches may be from the memory dies themselves as shown with circuitry for latch management 154. The latch management 154 circuitry may determine which latch receives data as described with respect to FIGS. 5a-8b. In one embodiment, there may be a memory die that is elected as a leader die and that elected leader die may perform the latch management 154 functions. In an alternative embodiment, the latch management 154 may also be considered or referred to as caching logic 306 shown in FIG. 3b.

The non-volatile memory 104 may include latches for data storage. A latch may be a circuit with states for storing information. In alternate embodiments, the latch may be a register or flip-flop circuit for storing two states. A latch may be referred to as a data storage element and may store a single bit of data where its two states are either 0 or 1. There are other embodiments of a latch and it may include a memory unit with two or more states. In one embodiment, a latch may be referred to as a cache memory and may be a memory element for temporarily holding data. As shown, there latches 304 on a memory die 302 that act as a cache. Retrieving data from the latches 304 may be faster than retrieving data from the memory die 302. Accordingly, latches may be referred to as a cache storage on the memory die.

Figure 3A:
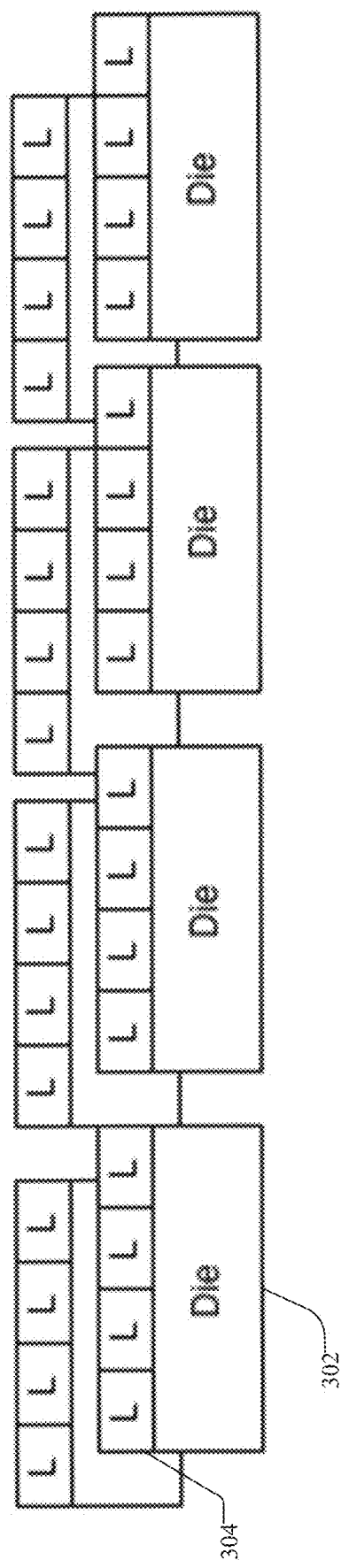
FIG. 3A is a block diagram of exemplary memory die with latches.

One example of a latch is a transfer data latch (XDL). FIG. 3A illustrates an exemplary memory die with latches. In particular, FIG. 3A illustrates one embodiment of the non-volatile memory 104 which includes a plurality of die 302. The non-volatile memory may include a plurality of die 302 and include a plurality of planes. There may be latches 304 on each of the die 302 or on each of the planes. The latches 304 may include one transfer data latch XDL and the remaining latches may be auxiliary latches as further discussed with respect to FIG. 4. In one embodiment, there may be one or more planes per each die and there may be one XDL for each plane and one or more auxiliary latches for each plane.

Figure 3B:
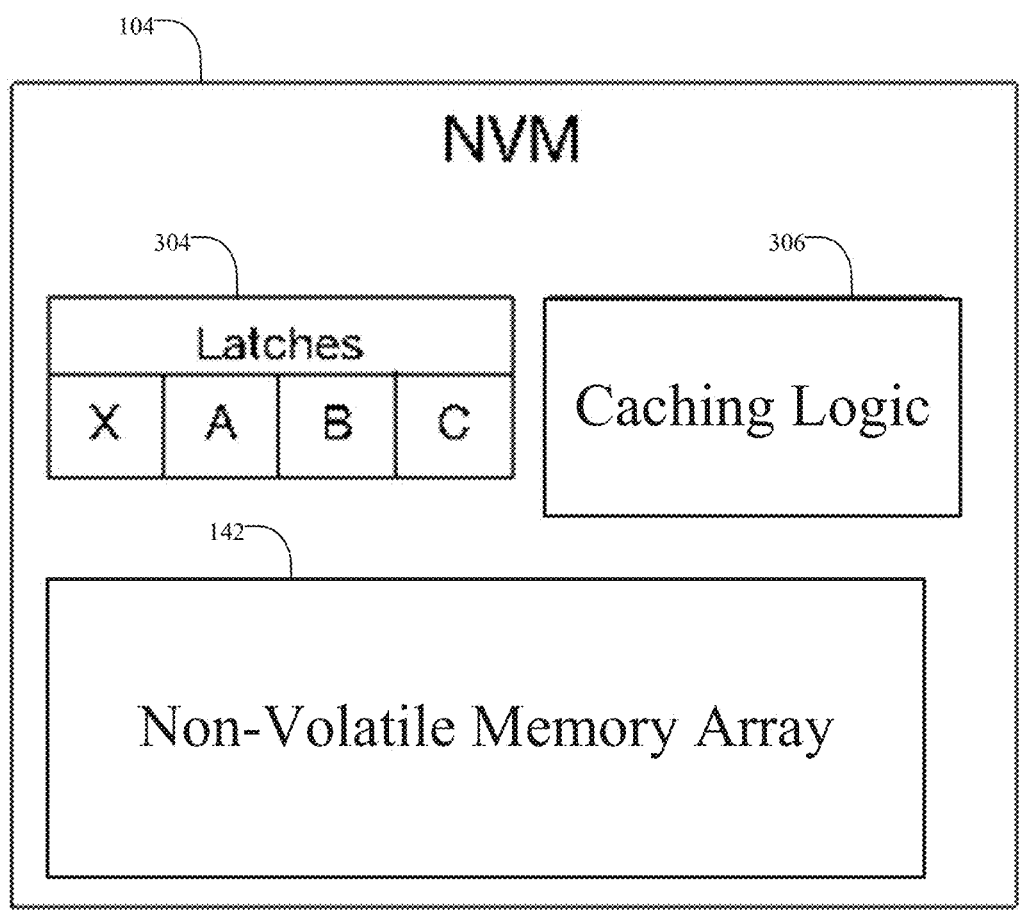
FIG. 3B is a block diagram of a NAND memory device with caching.

FIG. 3B is a block diagram of a NAND memory with caching. In one embodiment, the NAND memory may be non-volatile memory (NVM), such as NVM 104 shown in FIGS. 1A, 1B, 2A, and 2B. The NVM 104 may include an array of memory, such as non-volatile memory array 142 as shown in FIG. 2B. As in FIG. 3A, there may be latches 304 as part of the memory. The latches 304 may include auxiliary latches A, B, and C, as well as a transfer latch X. The transfer latch X may also be referred to as a transfer data latch (XDL). FIG. 3B illustrates that the NVM 104 may include caching logic 306 for caching data in the latches 304. As described with respect to FIGS. 10-12, the caching logic 306 can cache data in the latches. In particular, the caching logic 306 may manage fast read operations from the non-volatile memory 104, which may be NAND in one example.

Figure 4:
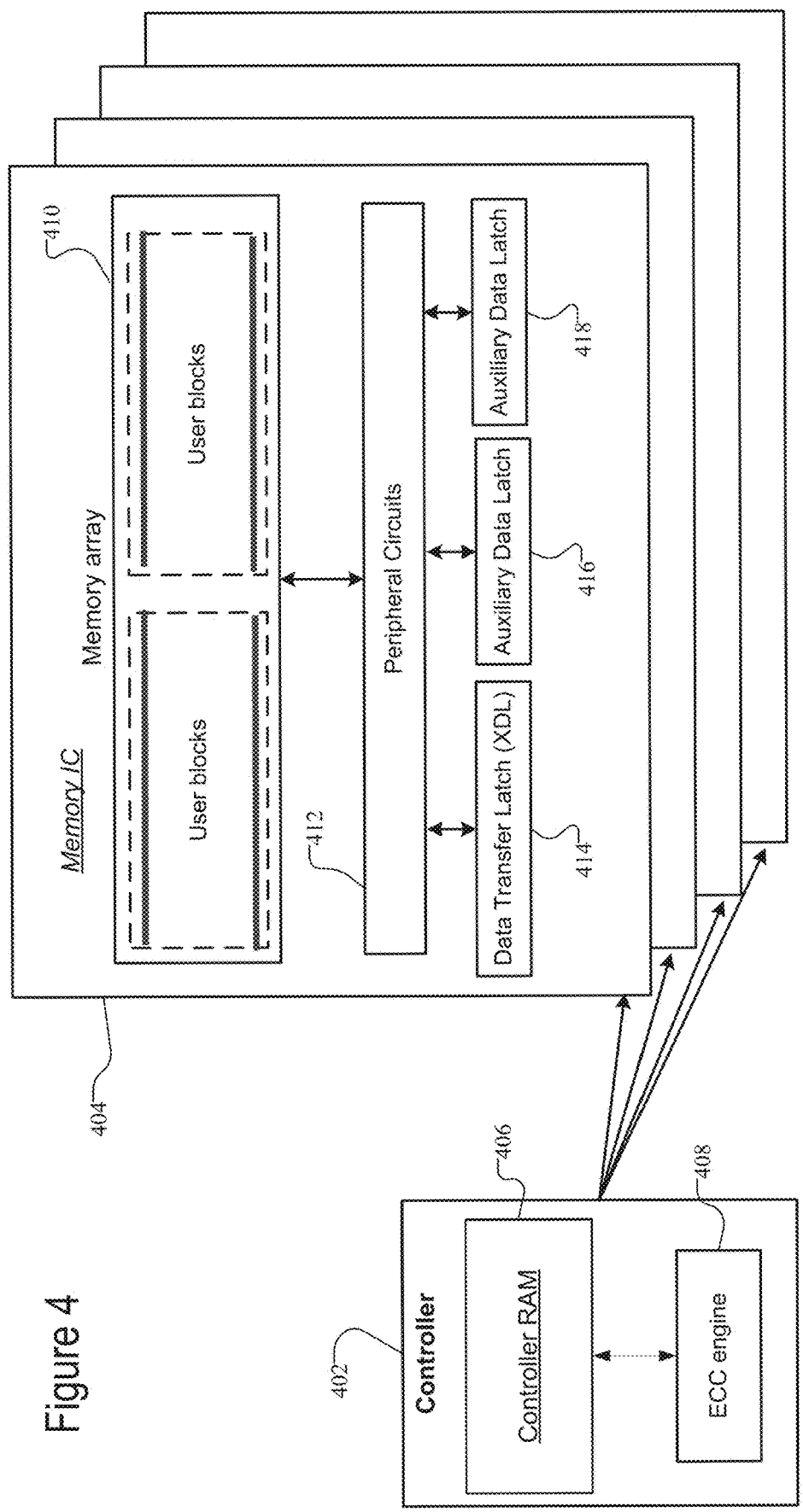
FIG. 4 is a block diagram of an exemplary memory controller and memory array.

FIG. 4 is a block diagram of an exemplary memory controller and memory array. FIG. 4 illustrates a simplified alternative embodiment of the memory system shown in FIGS. 1-2 with latches. The memory controller 402 is coupled with the memory integrated circuit (IC) 404. Although not labeled, there may be a plurality of memory ICs 404 that may correspond to a plurality of dies or a plurality of planes of memory. Although not shown, the memory IC 404 may include the caching logic 306 from FIG. 3B. The controller 402 may include random access memory (RAM) 406 and an error correction code (ECC) engine 408 as discussed in FIG. 2A. The controller 402 may communicate with each of the memory ICs 404 in order to provide host commands (e.g. read/write instructions) and the ECC engine 408 may provide corrections for the data that is read and written. Each of the memory ICs 404 may include a memory array of user blocks 410 and peripheral circuits 412. The peripheral circuits 412 may include the peripheral circuitry 141 shown in FIG. 2B, such as a reading circuit for reading data from the user blocks 412, a programming circuit for programming data to the user blocks 412, and/or a state machine or other logic.

A transfer data latch XDL 414 may communicate with the controller. The transfer data latch XDL 414 may be used data transfer between the host and the memory. The XDL may function as an intermediate data storage between the memory controller and memory. When instructed by the host system to write data to memory, the memory controller writes data to XDL. A programming circuit may write the data from the XDL to the specified memory block and page. In one embodiment, the programming circuit translates the binary representation of data received from the host system into programming voltages and time periods. The programming circuit applies these programming voltages for the programming time periods to memory cells to cause the memory cells to store electric charge. The amount of stored electric charge is representative of the binary representation of the received data. When instructed to read data from a specified memory page, a reading circuit may read data from the specified memory page into the XDL and the memory controller transfers the read data from the XDL to the controller RAM. In one embodiment, the reading circuit translates the amount of charge stored in a memory cell to a binary representation of the data corresponding to the amount of charge stored in the cell. By way of example and without limitation, the reading circuit may include current to voltage convertors, amplifiers and analog to digital convertors.

The memory IC 404 may include one or more auxiliary data latches 416, 418. The auxiliary data latches 416, 418 may typically be used for programming operations, but may be used for storage of pre-fetch data described herein. The auxiliary data latches 416, 418 may be different from the transfer data latch XDL 414 which is used for the transfer of data. As described herein, the auxiliary data latches 416, 418 may be used as part of the RLA process as a storage location for pre-fetch data. The number of auxiliary data latches may vary depending on the memory. In one embodiment, 3 bit per cell memory (×3) may include three auxiliary latches, while 4 bit per cell memory (×4) may include four auxiliary latches.

Generally, data latches store user data, temporary data, or quick pass write data. The transfer data latch XDL may be separated from the other auxiliary data latch circuits, and can receive data asynchronously supplied from the outside. It is the XDL that can transfer data to or from the external bus. In one example, a data latch may be utilized during a write as follows. On the basis of a data input command and a page address, the data is supplied to the XDL. Next, on the basis of a transfer command, the data in the XDL is transferred to other auxiliary data latches before the program command is issued. Similarly, during a read, data from the flash page is read in to the XDL before getting transferred out. In the RLA context, data that is read into the XDL is transferred into the other latches by issuing a transfer command. The controller or firmware may do the transfer and know what data is in which auxiliary latch.

FIG. 4 illustrates one embodiment of memory device with latches. The management of those latches may be from the controller 402 in a fully centralized architecture. Alternatively, the management may be fully de-centralized such that the NAND manages the latches and knows whether the data in a latch is valid, while the controller is not aware of the content of the latches. The micro-managing of the NAND is removed from the controller. Data can be read between multiple die on the same NAND bus (also referred to as a NAND channel) without involvement of the controller. The latches shown in FIGS. 3-4 can be shared between dies.

Figure 5A:
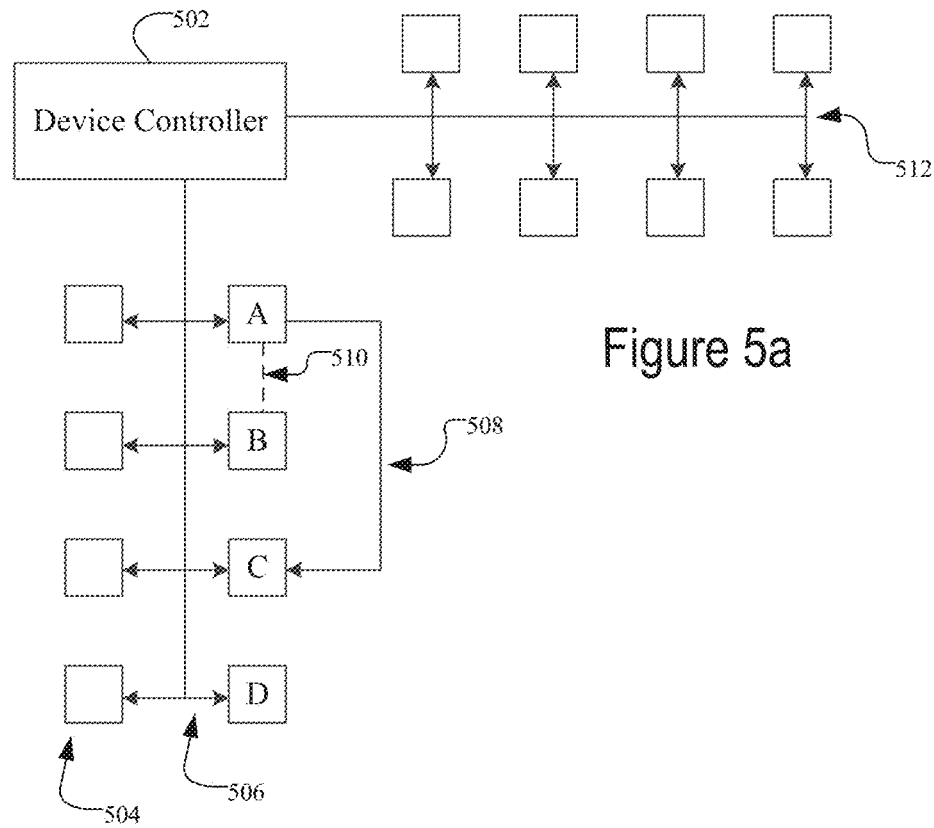
FIG. 5a is a block diagram of a partially de-centralized latch architecture.
Figure 5B:
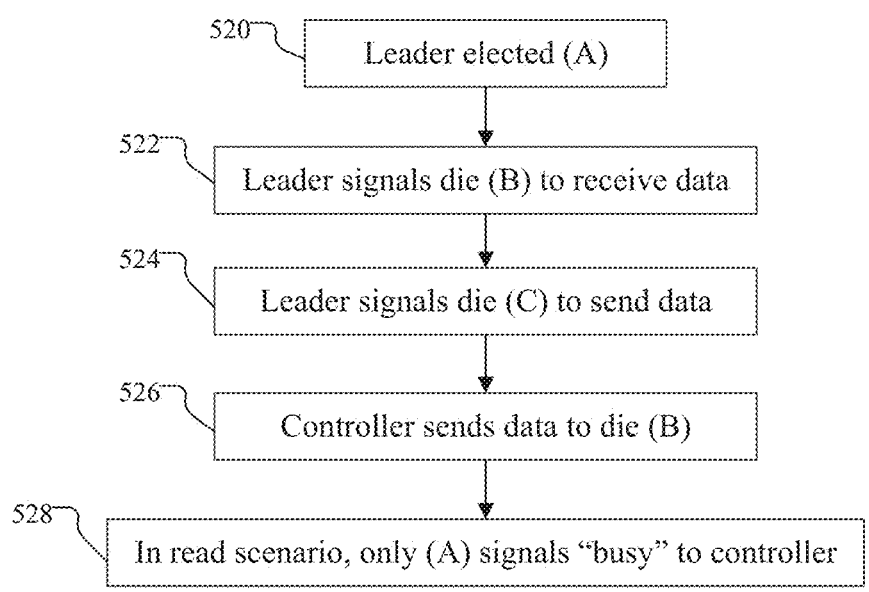
FIG. 5b is a flow chart of a process for managing a partially de-centralized latch architecture.

FIG. 5a illustrates a partially de-centralized latch architecture. FIG. 5a illustrates an embodiment in which NANDs that are located on the same NAND bus 506 can be controlled by one of the latches 504 on that bus rather than the device controller 502. Although not labeled explicitly, the 16 dies shown in FIG. 5a are referred to as 504 and the NAND bus/channels that connect the dies is referred to as 506. Four of the 16 dies are labeled A, B, C, and D. The device controller 502 is a memory controller that would control the data transfer to/from the latches in each of the dies 504 in a fully centralized latch architecture. As described, the embodiment shown in FIGS. 5a-5b is a partially de-centralized latch architecture in which one of the does 504 is established as a leader die. As described with respect to FIG. 5b, die A is the leader die. In this embodiment, NAND dies 504 that are located on the same NAND bus 506 may be configured to cooperate with each other to share their pool of latches. They may be configured to nominate a leader die, which acts as a proxy on their behalf. According to this embodiment, the leader die maintains a state machine reflecting not only its own state (i.e. data receive, data program, data program with cache, data sense, data sense with cache, occupancy state and content of each latch, etc.) but also the state of each of the other dies residing on the bus (of which it is acting as the leader or proxy). The identification of the leader die may be dynamic and can change during run time. For example, an external event (e.g. power cycle) may result in the selection of a different leader die or the controller may choose a different leader die.

In one embodiment, the leader die may be referred to as a manager leader. The manager leader die manages all data transfers to and from any latch residing on any die on the bus. When the device controller need to send data to be programmed, it sends the data on the bus and the leader determines which latch will receive the transferred data. In one embodiment, the controller may receive advance notice from the leader die of the target destination die in response to a write request. Likewise, the controller may receive advance notice from the leader die of the source die in response to a read request. In an alternative embodiment, the controller may be signaled to wait (e.g. ready/busy signal or "R/B" signal) upon a write request, and the leader die may then determine the target die and signals the selected target die to prepare to receive data in a particular latch by releasing the R/B to the controller to proceed with the transfer. Likewise, the operation may be similar for a read request except the leader die determines the source die and signals the selected target die to prepare to read data from a particular latch. The leader die may have internal latch management operations to improve latch utilization. In order to initiate operations, including maintenance, the leader die may assert the R/B signal to busy to suspend communication from the controller on the bus, and then initiate latch data transfer operations between latches inside NAND dies residing on the bus. When the latch data transfer operations are completed, the leader die can release the R/B to ready condition.

Although not labeled in FIG. 5a, the other set of eight die may have a different leader die selected. The leader die for that set of eight determines where data goes to/from any latches of those eight die. The leader may be chosen amongst all die connected on the same NAND bus 512 or NAND connection. There may be more or fewer die per NAND bus. As described below with respect to FIGS. 6-7, there may be a bridge in the NAND bus which allows for a leader to manage additional dies. In other words, if the eight die on the NAND bus 512 were instead connected to the die on the NAND bus 506, then a single leader die may manage all 16 die.

FIG. 5b illustrates a process for managing a partially de-centralized latch architecture. In block 520 a leader of the die 504 is elected. Rather than being referred to as the leader die, it may be referred to as the controlling die, master die, manager die, or other names reflecting that the leader die operates as a proxy for other die. In some embodiments, the selection of a leader may include 1) the die with address 0 is the leader, or 2) upon initialization, the first die, which is accessed by the controller, is nominated as the leader. There may be other exemplary ways to select the leader including basing the selection on certain metrics about the die, including health, wear, retention, etc. In block 522, the leader die signals to die B to receive data (according to decision of leader die A). This is shown in FIG. 5A by communication 510 between leader die A and selected die B. In block 524, the leader die A signals die C to send data. This is shown in FIG. 5A by communication 508 between leader die A and die C. The data transfer may be data from/to the host, or alternatively, the data transfer may be data between latches. For example, the leader may back up data existing in one latch by moving it to another latch in another die (without programming it to the nonvolatile array) and before receiving data to the first latch that will override the original data. A similar move from one latch to another may be useful during garbage collection operations. In block 526, the controller sends data to die B per the management from the leader die A. In block 528, a busy signal is read only from die A, as the controller only interacts with die A. Specifically, any busy signal for data transfers come from the leader die A rather than the other (i.e. slave) die.

In an alternative embodiment, the leader die may be a supervisor rather than a manager. This may be closer to a de-centralized scenario because the supervisor leader die does not have the same control or management of the manager leader die discussed above. Specifically, the supervisor leader may only sniff the bus in monitor mode. Data read operations are handled by the NAND die themselves, as the die are aware of the validity condition of the data held in the latch and its origin. Data write operations may be handled by the NAND die according to a pre-determined latch management scheme (order). In addition, the leader may monitor transactions involved and maintains the status of each of the dies and the data validity for each of its latches.

However, in order to improve latch usage efficiency, the leader may intervene in a transaction. In one example, upon receiving a write request to NAND die X, the leader may choose to avoid losing the data residing in the designated latch of die X, and transfer the data in the latch to another latch to avoid losing the data, such as in another die, just before the transfer from the controller begins. The leader can signal R/B to busy condition to suspend further communication from the controller, and initiate a transfer from one latch to another. The R/B signal can be released to resume the original write transaction from the controller. In addition, the leader die may choose to initiate a latch management operation (e.g. transfer of data from one latch to another). Specifically, the supervisor leader die may decide when certain cached data stays in a particular latch (e.g. data that is likely to be requested again).

As discussed above, the leader die may act as a leader for other die connected on the same NAND bus or NAND channel. In alternative embodiments, there may be other ways for connecting dies so that the leader can manage more dies. FIGS. 5a-5b referred to providing a capability to a die to handle the latch status and data transfers to/from other dies residing on the same bus (controller NAND channel). FIGS. 6a-7b describe how this latch management can extend beyond to another NAND bus acting as extension of the original bus.

The number of NAND channels in a controller may be determined according to system specification and target performance. Adding NAND channels may increase the bandwidth of data transfer (i.e. increasing potential performance) but may result with extra controller and product cost. In other words, the number of channels is a trade-off between performance and cost. Adding too many dies to a NAND bus may be problematic due to the electrical capacitance added by each die. When the number of dies connected to the same bus is increased too much, the total electrical capacitance becomes a limiting factor which either limits the number of dies allowed to be connected to the bus, or there is a need to reduce the maximum transfer rate of the bus. One choice to go beyond that limit (without compromising the transfer rate) is to add additional NAND channels in the design. However, this has an impact on cost.

FIG. 6a illustrates a partially de-centralized latch architecture with a depth bus extension. FIG. 5a illustrated two sets of eight die that each had a different NAND bus. Accordingly, those two sets of die would have different leader die. FIG. 6a illustrates that one set of die 604 on a particular NAND bus 606 is connected through a bridge 608 to another set of die on another NAND bus 603. The bridge 608 is connected to the original NAND bus (controller channel) 603 and to an extension additional bus 606 to which additional set of NAND dies are connected. The sets of dies (and the channels connecting them) connected to the bridge may be referred to as sides, in that there is a different channel on either side of the bridge. The bridge 608 enables to repeat commands and data sent over the 1st (original) bus 603 to the 2nd (extended) bus 606 without doubling the total electrical capacitance reflected on the 1st (or 2nd) bus. There is only one bus 603 connected with the controller 603, rather than two as in FIG. 5a.

The use of a bridge can provide an ability to double the amount of dies connected to the same original NAND channel in the controller 602 without compromising the data transfer rate on the bus. It also allows for the ability to increase the bus rate for the same number of dies connected to the NAND channel and to reduce the number of channels in the controller supporting the same total exportable logical block address (LBA) capacity or number of dies, if the reduced number of channels is sufficient to meet target performance specifications.

The bridge can be either part of the leading die or external to the leader die but controlled by the leader. Modes of operation can be similar to those mentioned with respect to FIGS. 5a-5b. Specifically, the leader can be a manager leader or a supervisor leader. Data transfer management may be performed similarly, such as with a handshake, but there may be additional enhancements. Data transfer from latches residing in dies, which are both on the same side of the bus (e.g. 603) need not to be provided to the other bus (e.g. 606) over the bridge 608. Thus, two different transfer operations can be handled in parallel on each of the busses 603, 606. Specifically, a transaction may be performed in parallel on other side of the bus. In particular, a transaction may be performed on at least some of the die on bus 603 in parallel with being performed on at least some of the die on bus 606. The bridge can be disconnected and reactivated to control the direction and to increase capacity, which may also increase the actual stability of being able to run different operations on either side of the bridge.

The use of a bridge in FIG. 6a is one embodiment in which the number of dies may be increased without significantly reducing performance due to the electrical capacitance of the additional dies. The bridge may be acting as a repeater. The de-centralization of latch management to one of the dies provides one solution. Specifically, a leader die from one set of the die (the die connected on the first bus 603) can provide management of data transfer for the second set of die (the die connected to the second bus 606).

FIG. 6b illustrates a process for managing a partially de-centralized latch architecture with a depth bus extension. The command flow describes a sequence of commands that would be enabled in a system employing extension buses shown in FIG. 6A. In block 620, a leader die D is elected. As shown in FIG. 6a, the leader die D is connected with a bridge 608 for managing a set of die on a different NAND bus 606 that is connected with the bridge 608. In block 622, the leader die D signals the die on a different channel to receive data. For example, leader die D signals die B to receive data. In block 624, the leader die D signals a different die to send data. For example, leader die D signals die C to send data. In block 626, leader die D signals busy (from the R/B signal) to the controller for the data transfer.

Figure 7A:
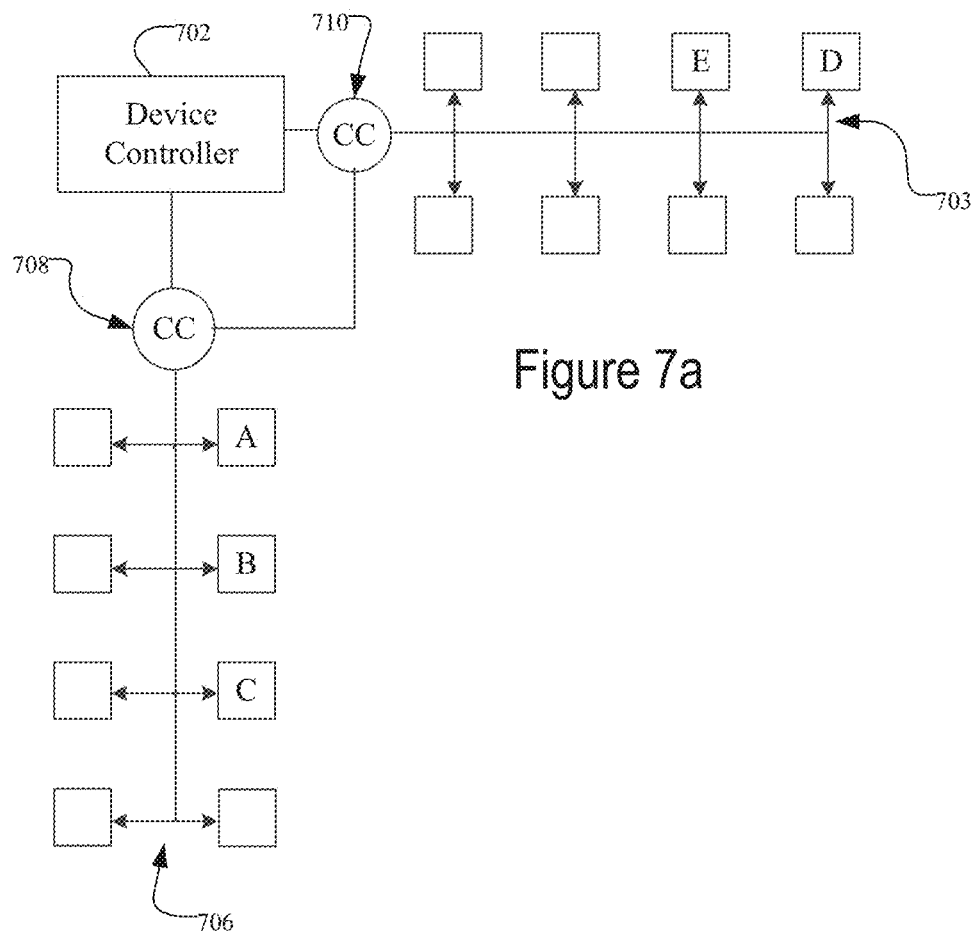
FIG. 7a is a block diagram of a partially de-centralized latch architecture with a lateral bus extension.

FIG. 7a illustrates a partially de-centralized latch architecture with a lateral bus extension. As compared with FIG. 6a (one bridge), FIG. 7a illustrates that there is a lateral (peer) bridge 708, 710 between two different NAND channels 703, 706. In this mode of operation, the leader die may choose to utilize resources (e.g. latches) residing in dies which are not part of its own bus (e.g. bus 703), but rather reside on another bus (e.g. bus 706). The leader of one bus (channel) may communicate and cooperate with a leader of another bus (channel) through the respective bridges 708, 710 connecting the NAND buses 706, 703. When one leader requests to initiate transfer of data from/to another latch controlled by a different leader, it may signal the leader in the other channel its request. The leader may accept the request or reject it.

Without the lateral bus extension through the bridges 708, 710 the communication and cooperation of dies would have been only through the controller 702. The bridges 708, 710 allow for the transfer of data between busses 703, 706 without the controller 702. Using a leader die on both busses can de-centralize the latch management away from the controller 702.

Figure 7B:
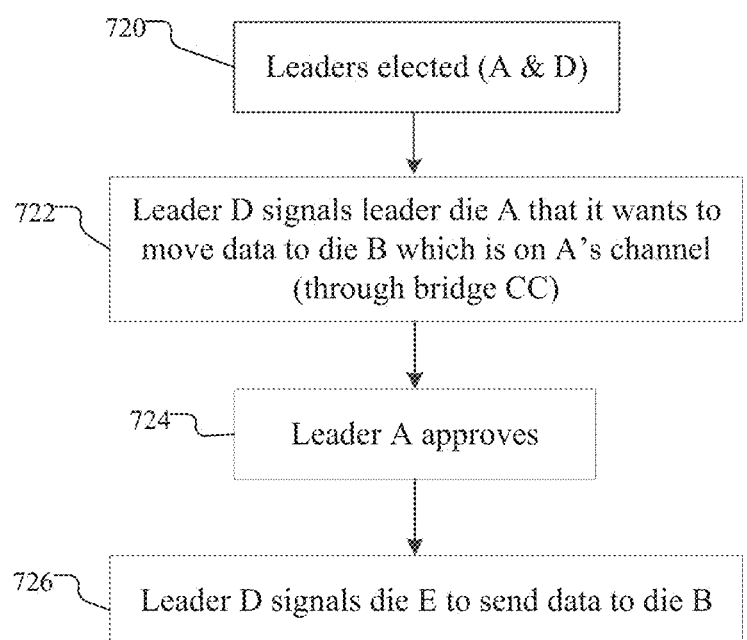
FIG. 7b is a flow chart of a process for managing a partially de-centralized latch architecture with a lateral bus extension.

FIG. 7b illustrates a process for managing a partially de-centralized latch architecture with a lateral bus extension. In block 720, leaders are elected for each side. Leader A is elected for the NAND bus 706 and Leader die D is elected for the NAND bus 703. In block 722, the leader die D signals leader die A that it wants to move data from die E to die B. This movement of data must be through the respective bridges 708, 710. Leader A can approve or deny the request. In block 724, leader die A approves the request. In block 726, leader die D signal die E to send to die B.

There may be a R/B signal may be used by the leaders to suspend the controller when either the data in the latch is not available (valid) yet, or is currently engaged handling a request originated from the other leader. When the data or transaction are completed, the R/B signal will be released. One transaction from the controller 702 on one bus, may trigger asserting R/B on both buses, as it may involve latches residing on both channels. The "internal bridge" bus may be used also for internal arrangement of the data between dies. This could be based on hot/cold attributes, or a grouping according to TT/GAT groups for internal garbage collocation. In some embodiments, the leader die role may be narrowed, and the management between the dies (either on the same channel or in different channels) may be done in an autonomous way, such as in a handshake protocol.

There may be internal NAND management operations, which are known in advance and are required to run in parallel to handling transactions of read and write arriving from the host. Such operations are not necessarily limited to latch data transfers, but may also include sense and program operations, and internal NAND parameters values changes or calibrations. One operation may be garbage collection, in which data in one page/block of one NAND die is relocated to another page in another block, potentially in another NAND die. In other words, the leader die can manage garbage collection through a sequence in which data is transferred between different die. The different die may be located on the same bus or may be connected, such as shown and described with respect to FIG. 6a and FIG. 7a. This may be beneficial to the controller if such operations can be run in the background without the controller intervention, and only notifying the controller upon operation completion either with positive or negative status.

In one embodiment, there may be a replay sequencer (pico low level flash sequence). This may be a new capability for the leader die. The leader die may be loaded (from the controller) with a sequence of NAND operations. Once activated, the leader die can start running them one by one until successful completion or an error. Since there are two masters on the NAND bus (the controller and the NAND die leader), there may be an arbitration mechanism of the NAND bus. This can be done by the R/B signaling described above. Specifically, the leader die may not transmit the next command from the (pre-loaded) sequence when the bus is busy (e.g. busy signal from the controller). The leader die monitors all the transactions coming from the controller and is aware when the bus is busy due to the controller. When the leader need to transmit the next command in a sequence, it acquires the bus by signaling busy on the R/B signal, sending the command, and then releasing it by de-asserting the R/B.

Having two masters may result in conflicts between the leader die and the controller. A contention may arise by a conflict of an access to a die, which is temporarily managed by two masters. A simple mechanism to solve the conflict includes allowing the controller to be aware of the dies that are listed in the sequence being run by the leader. The controller is not just aware of the exact position (progress status) in the sequence. When the controller needs to access (e.g. read or write) a die which is listed in the sequence, it acquires access to the die by sending an acquire die command to the leader. If the die is currently free (i.e. it is not activated currently in the sequence), the acquire command is returned immediately with a confirmation status. Otherwise, a busy signal is returned, or the response is delayed until the die is free. If during the time of acquire, the sequence arrives to the point where the acquired die needs to be operated, the sequence is paused until the die is released from the controller. When the controller no longer needs access to the die (e.g. read operation completed) a "release die" command is sent to the leader. The leader may potentially resume playing a sequence if it was paused, due to arriving to a die, which was temporarily acquired by the controller. This capability may reduce overhead from the controller (improve system performance) in activities where heavy access from the host is being done in parallel to heavy internal maintenance operations. This may also be referred to as suspend/resume commands to achieve quicker bus responses. There is a trade-off between a full release and partial release (using suspend/resume) which is the trade-off between a full release of resources but a longer latency response, to a partial release of resources with a faster latency of response.

A NAND suspend/resume operation may be utilized to further improve system behavior and reduce latency to the controller. If the controller is trying to acquire a die, which is currently engaged in a lengthy operation (e.g. fine page programming), the leader may choose to immediately suspend the running operation at the target die. This would grant access to the die with much lower latency, rather than waiting for the lengthy operation to be completed. If during a suspended condition there is a limitation to the type of operations allowed (from the controller) to the die, the controller may choose either to acquire the die fully (without suspend mode) or acquire it in suspend mode. There is a tradeoff between latency and access capabilities required. The acquire mode (full/partial) may be provided as an additional parameter by the controller. Accordingly, the leader die may determine if it needs to fully wait for operation completion or just wait for suspend operation completion before granting access to a die.

An INTERNAL RAID functionality may be implemented rather than RAID by performed by the controller. Utilization of the "pico-LLFS" and the "internal bridge" may perform the RAID functions internally at the die level (and to offload the controller overhead). RAID operations may be based on XOR operations, which are natural capabilities of the die latches.

Figure 8A:
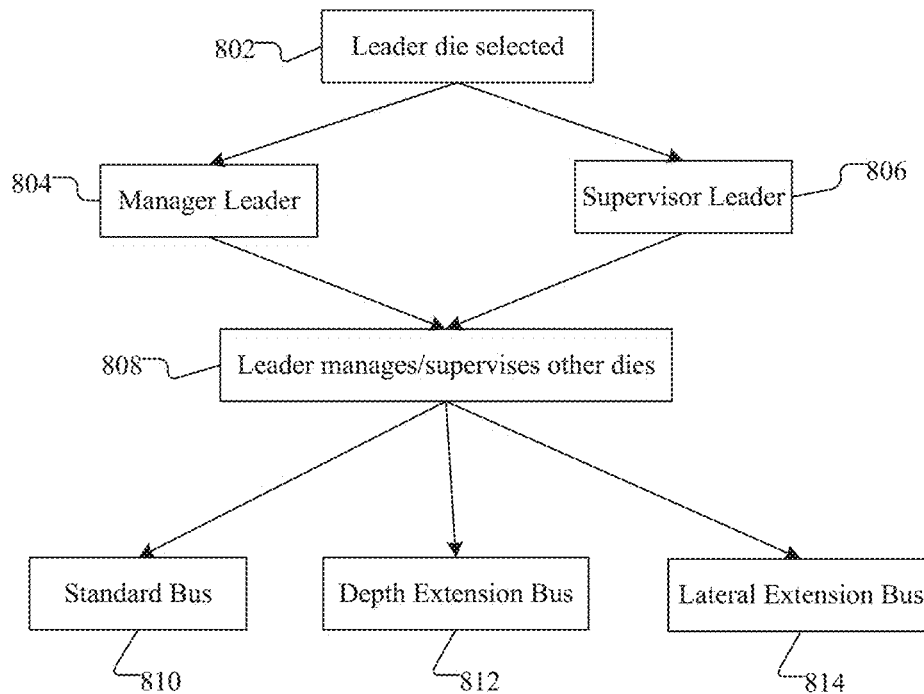
FIG. 8a is a flow diagram of options for a partially de-centralized latch architecture.

FIG. 8a is a flow diagram of options for a partially de-centralized latch architecture. In block 802, a leader die is selected. The leader die may be a manager leader 804 or a supervisor leader 806. The distinction between a manager leader 804 and supervisor leader 806 is described with respect to FIG. 5b. In block 808, the selected leader die manages or supervises the other die. The other die that are managed/supervised may depend on whether there is a standard bus 810, a depth extension bus 812, or a lateral extension bus 814. A standard bus 810 embodiment is illustrated in FIG. 5a. A depth extension bus 812 embodiment is illustrated in FIG. 6a. A lateral extension bus 814 is illustrated in FIG. 7a.

Figure 8B:
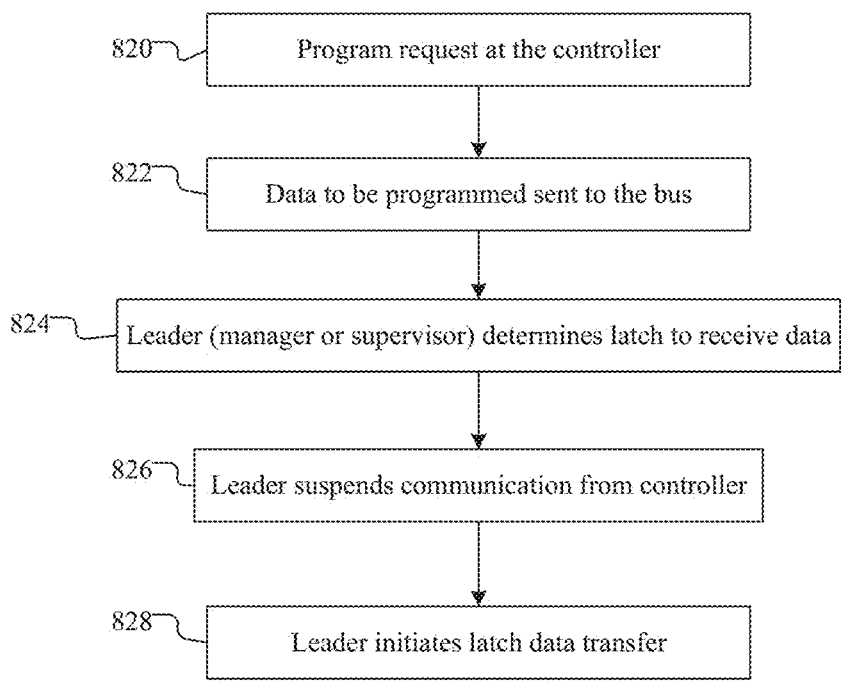
FIG. 8b is a flow diagram of data transfer management in a partially de-centralized latch architecture.

FIG. 8b is a flow diagram of data transfer management in a partially de-centralized latch architecture. In block 820, a program request is made at the controller. The data to be programmed from the program request is sent to the bus in block 822. The leader die can then determine which latch (and which die) receives the data in block 824. The leader suspends communication from the controller in block 826 and initiates a data transfer to the determined latch in block 828.

Figure 9A:
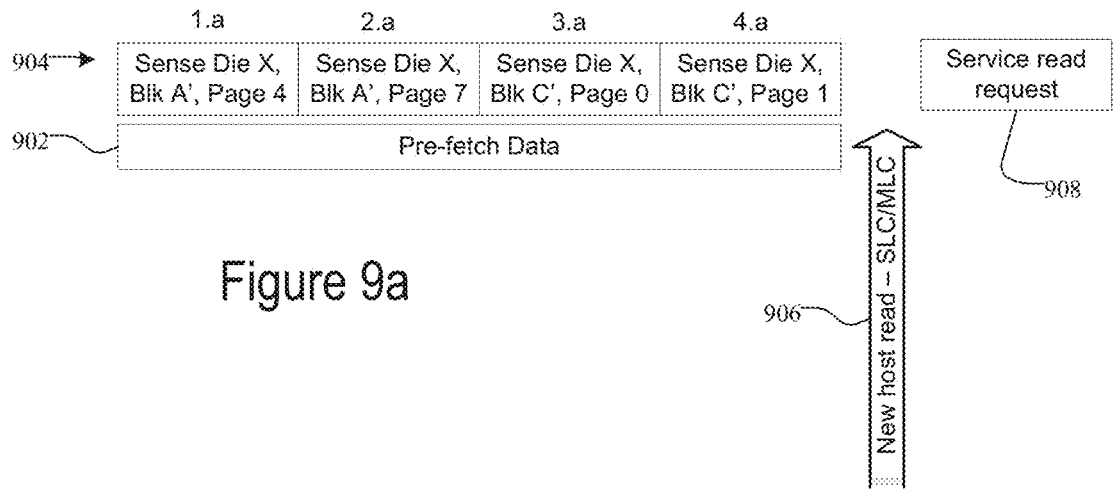
FIGS. 9A, 9B, and 9C are block diagrams illustrating read look ahead (RLA).
Figure 9B:
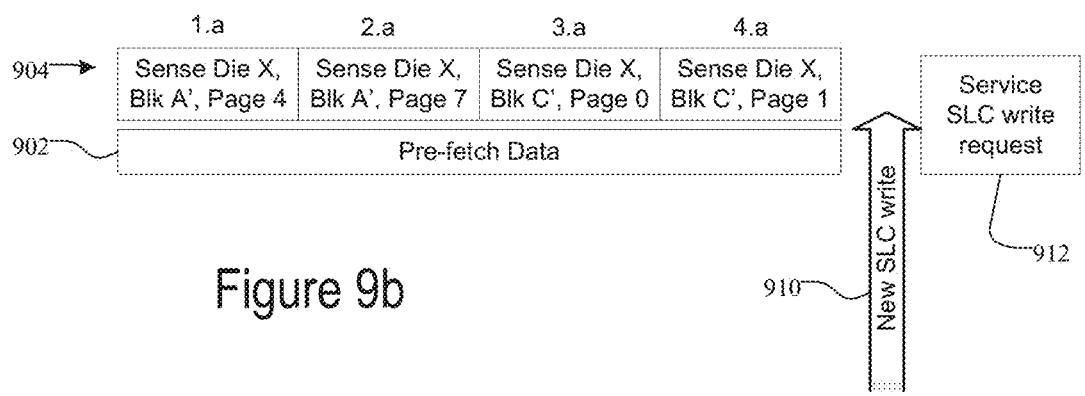
Figure 9C:
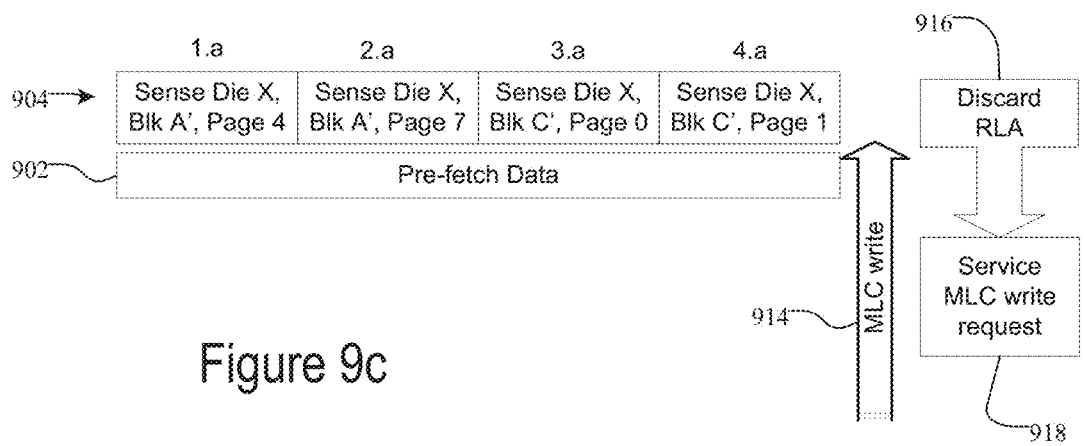

FIGS. 9a, 9b, and 9c are block diagrams illustrating read look ahead (RLA). RLA may also be referred to as a pre-fetch in which data is fetch before it is actually requested based on a prediction or speculation of future requests. Pre-fetch is an exemplary host operation that may be part of the MML 138 in one embodiment. The pre-fetch may include a read look ahead (RLA) so that the host knows what information it wants next. This look ahead may be used to predict the next instruction or command and then to prepare the device to be ready for that instruction or command.

The pre-fetched data 902 may be stored in the auxiliary latches 904 as shown in FIGS. 9a-9c. Once the pre-fetch data 902 is identified, it is packed in the spare latches. FIGS. 9a-9c illustrate four auxiliary latches 904, which is merely exemplary. The auxiliary latches 904 are labeled as 1.a, 2.a, 3.a, and 4.a and are further described with respect to FIG. 10. FIGS. 9a, 9b, and 9c illustrate a sequential flow of receiving commands and the response to those commands. In FIG. 9a, a new host read command 906 is received. The new host read is for single level cell (SLC) or multi-level cell (MLC) memory. In response, the read request is serviced 908. In FIG. 9b, a new write command 910 is received. The write command 910 may be SLC. In response, the write request is serviced 912. In FIG. 9c, a new write command 914 is received. The write command 914 is for MLC memory only. As a result the RLA may be discarded 916, and the MLC write request is serviced 918. Alternatively, the RLA may not be discarded if the write can be routed to another die/plane (as described with respect to FIG. 13). A MLC write request may require more memory than just a single latch. In other words, the auxiliary latch content may be maintained as long as an MLC write does not come in which requires more than one latch. Depending on how many latches are needed, data may be discarded accordingly.

Figure 10:
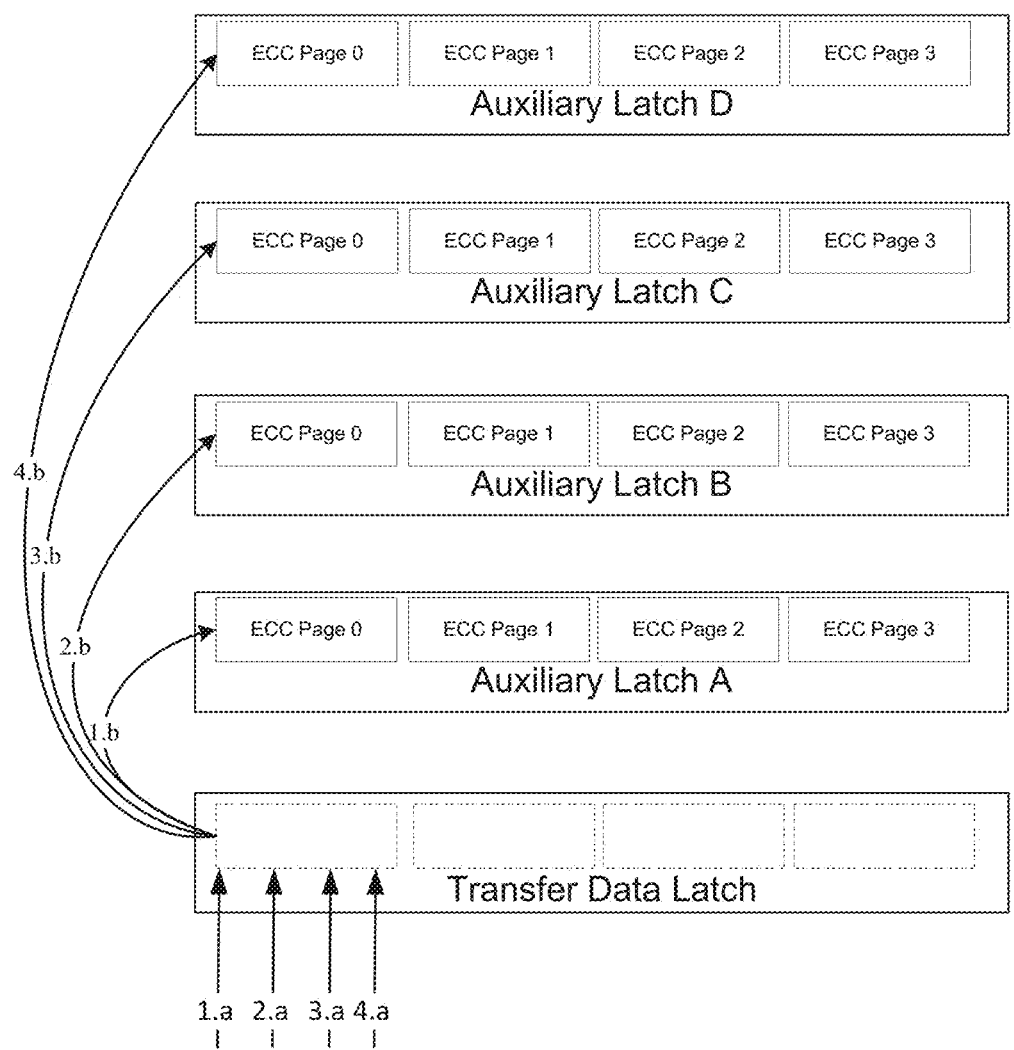
FIG. 10 is a block diagram showing data transfers with auxiliary latches.

FIG. 10 is a block diagram showing data transfers with auxiliary latches. The four commands 1.a, 2.a, 3.a, and 4.a may be received at the transfer data latch XDL. The XDL can then utilize the auxiliary latches as a read look ahead cache. Accordingly, the data is respectively sent to auxiliary latches A-D.

Each latch may be considered to be its own parallel path. FIG. 10 illustrates that the pre-fetched data is readily available in parallel paths and can be sent to the host as soon as the current operation on the bus is complete. This may improve efficiency of the dies and the overall user performance. The writing of data into each of the auxiliary latches form the data transfer latch XDL may be its own parallel process. Conversely, the processing would need to be sequential (sense then transfer, sense then transfer, etc.), but the pre-fetch to the auxiliary latches may be performed in parallel.

The data from the transfer latch (XDL) may be transferred to the auxiliary latches until all of them are packed. The packing may be performed by a simple pad operation in the latches. A start and end column address can be used to pad the XDL around the ECC pages of interest before moving the data to the auxiliary latches. The data received in the transfer latch can be spread out amongst the latches or alternatively maybe just going to one latch. Once the data is sensed, part of it may be transferred to the first latch depending on a size of the data chunk. If the chunk matches the size of the transfer latch the entire data may be transferred to just one of the auxiliary latches.

The (auxiliary/spare/other) latches may be temporary buffers within the memory which can hold data. They may be internal data storage, whereas the transfer data latch XDL can transfer data to and from the outside (e.g. with a host). A read operation includes a sense which pulls data into one of those latches and then a transfer which takes the data from the latch and moves it to the controller. A read operation includes the sense and the transfer. The transfer may be performed with the XDL. As described, if the XDL is backed up, the sense can be performed, but the data can be pushed onto other latches to hold until the XDL is ready for the transfer. In other words, the sense and transfer process are performed separately and the transfer can be delayed by temporarily storing the data that is sensed in the other latches. FIGS. 11-13 illustrate and describe the sense and transfer flow during a RLA operation using auxiliary/spare latches as the RLA cache.

Figure 11A:
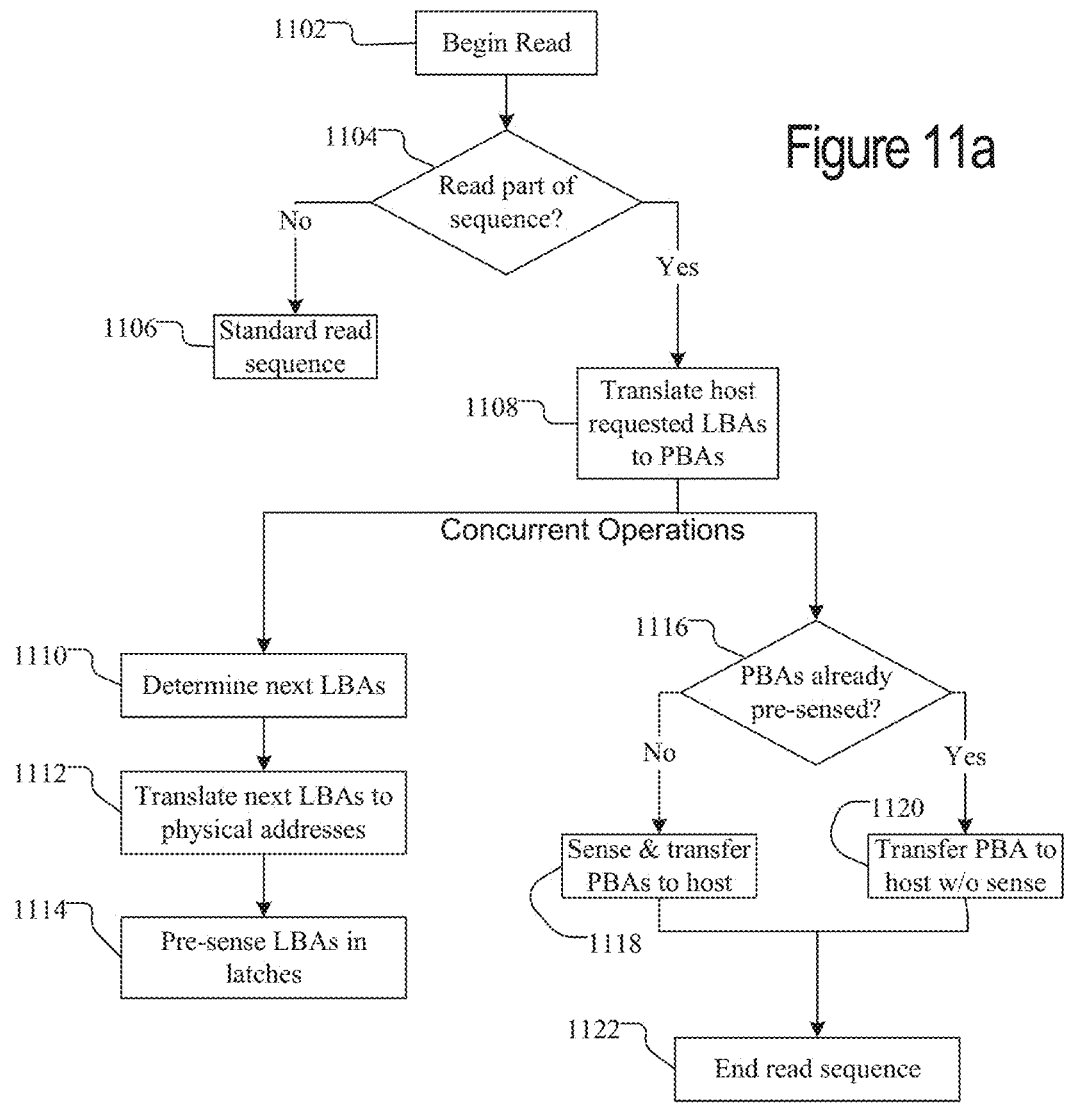
FIGS. 11A and 11B are flow charts of the data flow for a pre-sense.
Figure 11B:
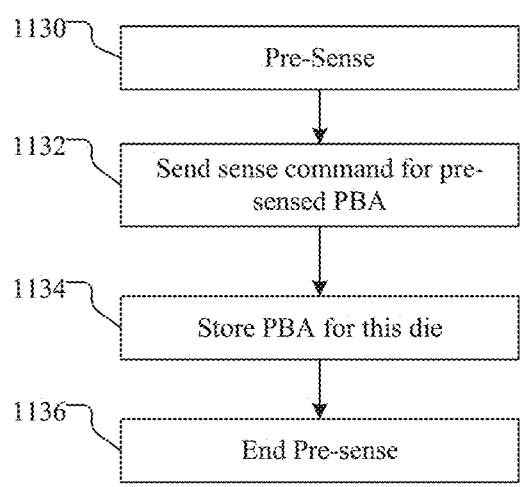

FIGS. 11a and 11b are flow charts of the data flow for a pre-sense. As described, RLA may utilize latches to store pre-fetch data. The commands that are pre-fetched include read commands, which include a sense and transfer. FIGS. 11a-11b illustrate one embodiment in which the sense and transfer functions are separated.

In FIG. 11a, the read begins in block 1102 with a read command or instruction from the host. A determination is made as to whether the read is part of a sequence in block 1104. In other words, can future commands be predicted for the received command? If not, then the standard read sequence is performed in block 1106. If the read can be predicted in block 1104, then the host requests logical block addresses (LBAs) are translated to physical block addresses (PBAs) in block 1108. The next LBAs are determined (block 1110), translated to physical addresses (block 1112), and pre-sensed into latches (block 1114). This operation may be concurrent with a check to see if the PBAs are already pre-sensed in block 1116. If the PBAs are not already pre-sensed, then the sense and transfer of the PBAs to the host is performed in block 1118. If the PBAs were already pre-sensed in block 1116, then the PBA is transferred to the host without a sense in block 1120. The read sequence is ended in block 1122. The determinations at blocks 1104 and 1110 may be performed by a sequential prediction circuitry. The pre-sensing (blocks 1114, 1116) may be performed by a back end module (e.g. NAND interface). The translation and read (blocks 1106, 1108, 1112) may be part of the MML or flash translation layer. The host may begin the read (block 1102) and the host or a host interface may handle the transfer and ending the read sequence (blocks 1118, 1120, 1122).

FIG. 11b illustrates operations of the non-volatile memory or NAND for the pre-sense or read prediction. In FIG. 11b, the pre-sense is began in block 1130 with a sense command sent for pre-sensed PBA in block 1132. The PBA is stored for the die in block 1134 and the pre-sense is ended in block 1136.

Figure 12A:
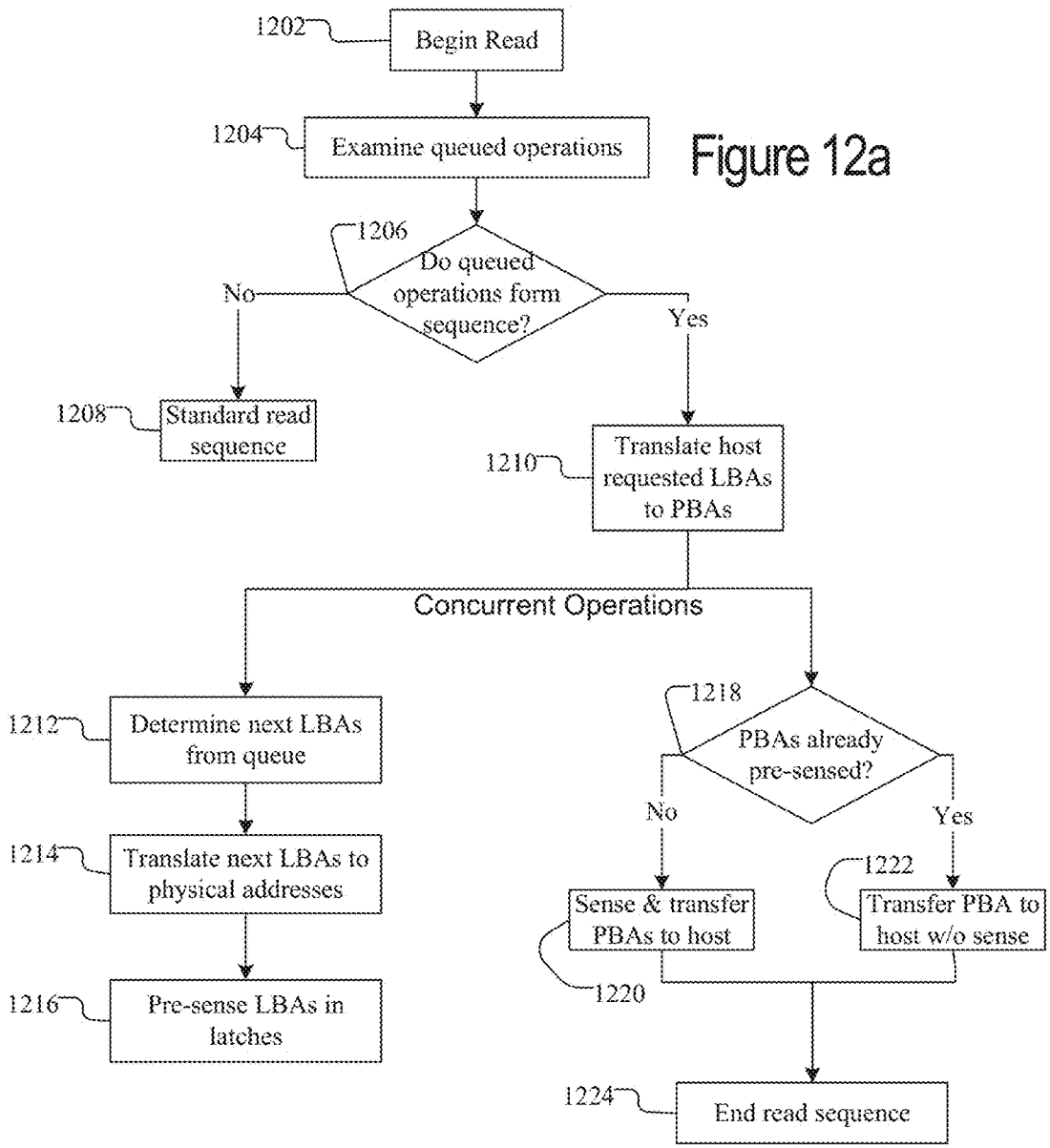
FIGS. 12A and 12B are flow charts of the data flow for a pre-sense with multiple latches.
Figure 12B:
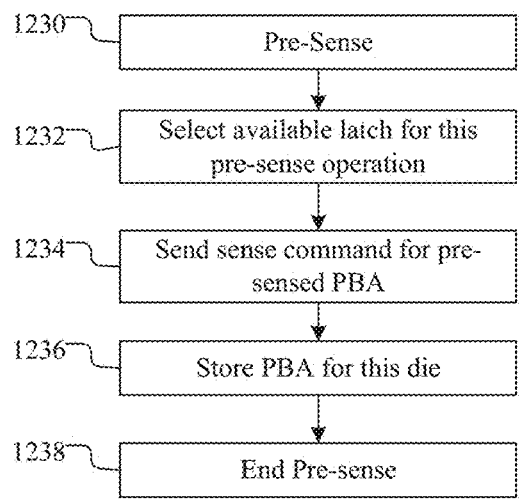

FIGS. 12a and 12b are flow charts of the data flow for a pre-sense with multiple latches. FIGS. 12a-12b illustrate an alternative embodiment with a multi-latch pre-sense operation. Specifically, the latch being used for as a RLA cache is stored and used for the pre-sense operation.

In FIG. 12a, the read begins in block 1202 with a read command or instruction from the host. Operations or commands that have been queued are examined in block 1204. A determination is made as to whether the queued operations are part of a sequence in block 1206. If the operations are not part of a sequence, then the standard read sequence is performed in block 1208. If the read can be predicted in block 1206, then the host requested logical block addresses (LBAs) for the current command are translated to physical block addresses (PBAs) in block 1210. The next LBAs are determined (block 1212), translated to physical addresses (block 1214), and pre-sensed into latches (block 1216). This operation may be concurrent with a check to see if the PBAs are already pre-sensed in block 1218. If the PBAs are not already pre-sensed, then the sense and transfer of the PBAs to the host is performed in block 1220. If the PBAs were already pre-sensed in block 1216, then the PBA is transferred to the host without a sense in block 1222. The read sequence is ended in block 1224. The determinations at blocks 1204 and 1212 may be performed by a sequential prediction circuitry. The pre-sensing (blocks 1216, 1218) may be performed by a back end module (e.g. NAND interface). The translation and read (blocks 1208, 1210, 1214) may be part of the MML or flash translation layer. The host may begin the read (block 1202) and the host or a host interface may handle the transfer and ending the read sequence (blocks 1220, 1222, 1224).

FIG. 12b illustrates operations of the non-volatile memory or NAND for the pre-sense or read prediction. In FIG. 12b, the pre-sense is begins in block 1230 with a selection of an available latch for the pre-sense operation in block 1232. In a multi-latch environment, the latch to be used for the pre-sense operation may be selected as in block 1232. A sense command sent for pre-sensed PBA in block 1234. The PBA is stored for the die in block 1236 and the pre-sense is ended in block 1238.

Figure 13A:
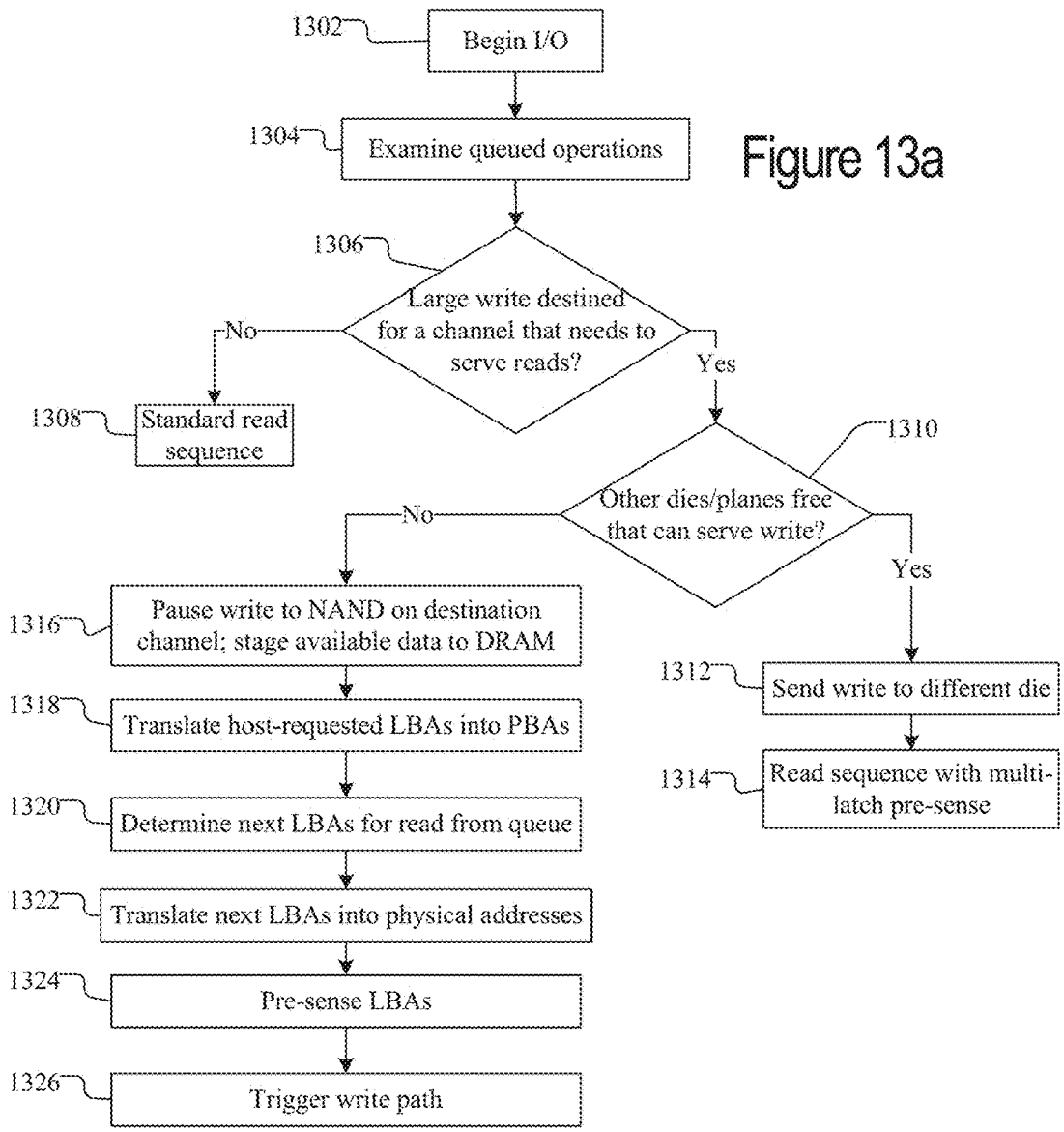
FIGS. 13A and 13B are flow charts of the pre-sense data flow with a mixed workload.
Figure 13B:
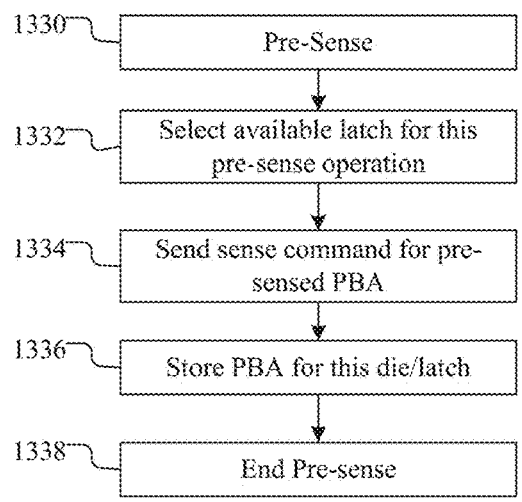

FIGS. 13a and 13b are flow charts of the pre-sense data flow with a mixed workload. In FIG. 13a, a pre-sense in a mixed workload is illustrated. In block 1302, the input/output process begins with queued operations being examined in block 1304. A determination is made as to whether a large write is destined for a channel that needs to serve reads in block 1306. If not, a standard read sequence proceeds in block 1308. If a large write is destined for a channel that needs to serve reads, then a check is made as to whether other dies or planes are free to serve the write in block 1310. If there is another die/plane that is free to serve the write, then the write is sent to a different die in block 1312 and the sequence is read with multi-latch pre-sense in block 1314. If there are no other dies/planes that are free to serve the write in block 1310, then the write is paused on the destination channel and all available data is staged to DRAM in block 1316. Host requested LBAs are translated to PBAs in block 1318. The next LBAs for read from the queue are determined in block 1320. The next LBAs are translated into physical addresses in block 1322. The LBAs are pre-sensed in block 1324 and the write path is triggered in block 1326.

FIG. 13b illustrates operations of the non-volatile memory or NAND for the pre-sense or read prediction. In FIG. 13b, the pre-sense is begins in block 1330 with a selection of an available latch for the pre-sense operation in block 1332. In a multi-latch environment, the latch to be used for the pre-sense operation may be selected as in block 1332. A sense command sent for pre-sensed PBA in block 1334. The PBA is stored for the die in block 1336 and the pre-sense is ended in block 1338.

If multiple commands are pending for a die and one of them can be fulfilled via RLA, it may be prioritized above the other pending commands. This RLA prioritization may improve performance. If there are multiple read requests pending for the same die and one of them is pre-sensed, then it may be prioritized over the other ones so that it can benefit from the RLA.

Referring back to FIG. 3B, the latches are illustrated as auxiliary latches A, B, and C, as well as the transfer data latch (XDL) X. A read command includes both a sense and transfer operation. As described, the NAND (e.g. NVM 104) may skip the sense operation for certain commands. Skipping the sense operation is performing the transfer operation only in response to the command. This skipping may be performed by the NAND (e.g. NVM 104) rather than the controller. In other words, the latch management may be fully de-centralized in that the NAND die rather than the controller is managing. The controller may issue the read commands, and to the extent a read command may include a read to the same latch, the sense operation for that read command may be skipped and only the transfer operation is performed. The caching logic 306 of the NAND may skip the sensing operation for repeated commands from the controller. The controller may manage pre-sensing, but the NAND skips the sensing.

When a read command is received from the controller, the NAND or NVM 104 may automatically detect whether the data is already at the XDL, in which case, the sense operation may be skipped and the transfer operation for the XDL is performed. The NAND or NVM 104 is performing the automatic management of the pre-sensing and handling of multiple requests. In the example of FIG. 3B, if the auxiliary latches A, B, or C are populated with data for a subsequent read command, then it can be pulled from that latch without a sense operation by the NAND or NVM 104.

In one embodiment, pre-populate speculative reads to the cache latches may be performed. The NAND or NVM 104 may monitor and/or detect overlap read to the same address and will skip sensing due to the overlap. In another embodiment, a least recently used ("LRU") eviction strategy of latched data may be used when new reads are requested. This LRU may include shuffling of data to other latches as needed in the same die or using latches of another die.

There may be protection of latch overwrite during SLC write. For example, the data in latch X may be moved to latch A (which is evicted in advance) and an SLC write using the X latch may be performed without overwriting the X latch read data. Another embodiment may be when a write operation is followed by a read, in which case the data about to be written in the controller is stored for a pre-defined period of time in the controller cache increasing cache hit rate.

Figure 14:
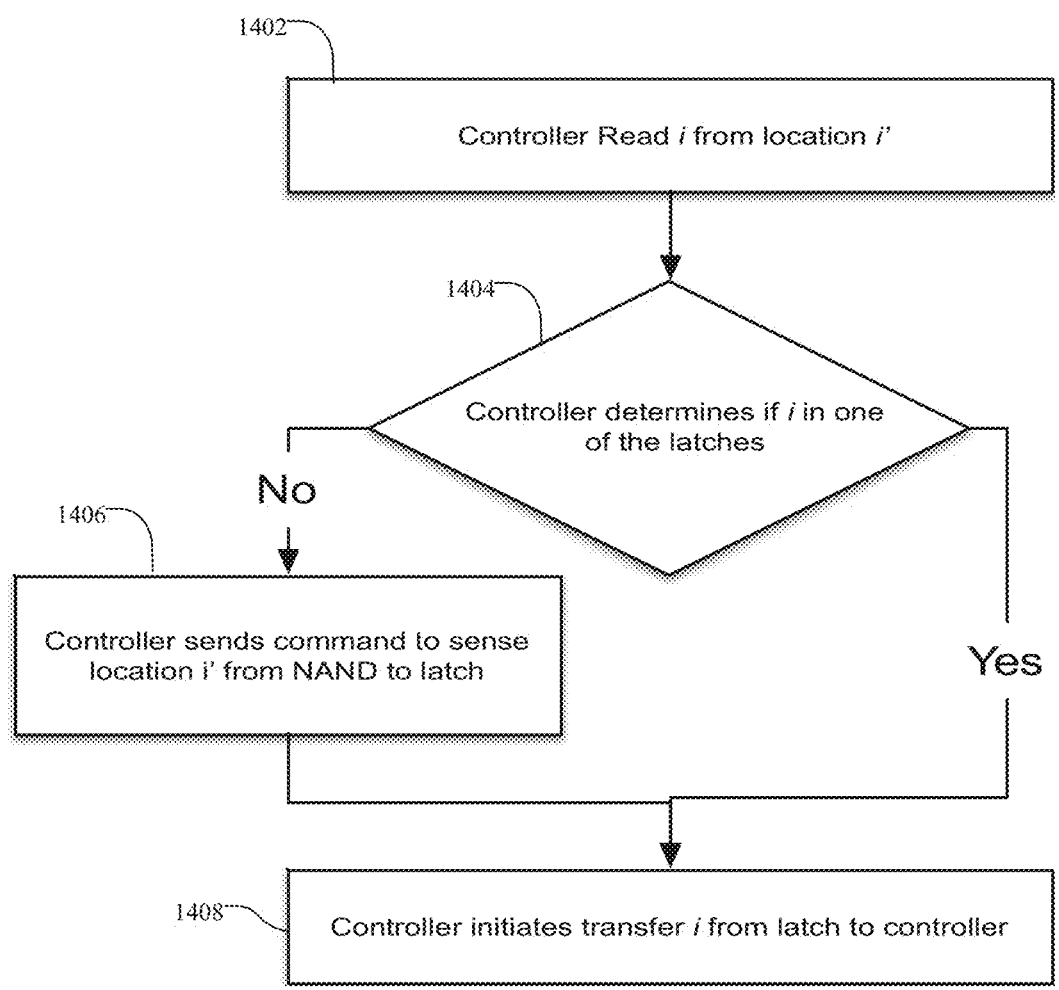
FIG. 14 is a flow chart of a controller based approach for cache read from latches.

FIG. 14 is a flow chart for controller based transferring of data using latches as cache. In block 1402, a read command is issued from the controller for reading data i from location i'. The controller determines if i is stored in one of the latches in block 1404. If i is not stored in one of the latches, then the controller sends a command to sense the location of i' from the NAND to the latch in block 1406. In other words, the sense operation is performed for determining the sense location i' when data i is not already in one of the latches. If the controller determines that the data i is already in one of the latches, then the controller initiates the transfer of data i from the latch to the controller as in block 1408. In other words, the sense operation is not performed when data i is already in one of the latches and the transfer operation is performed to transfer from the latch to the controller while the sense operation is skipped.

Figure 15:
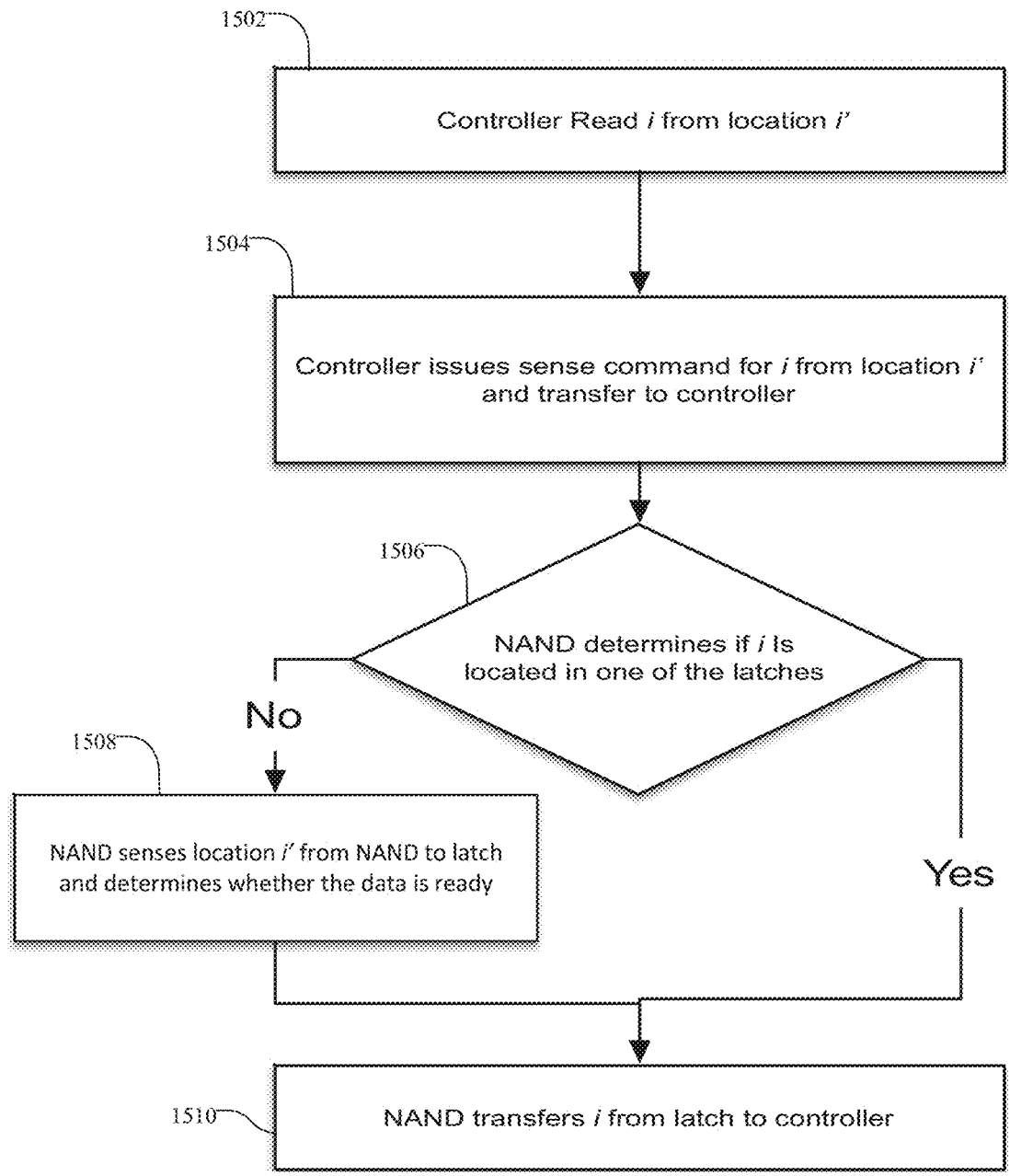
FIG. 15 is a flow chart of a NAND based embodiment for transferring of data using latches as cache.

FIG. 15 is a flow chart of a NAND based embodiment for transferring of data using latches as cache. In particular, FIG. 15 illustrates an embodiment in which the NAND, rather than the controller, determines whether data is already in latches similar to block 1404 of FIG. 14. In block 1502, a read command is issued from the controller for reading data i from location i'. In block 1504, the controller issues a sense command for i from location i' for transferring to the controller. The sense and transfer may be two separate operations that can be decoupled from the controller's point of view, in that they can be sent at different times. The NAND determines if i is stored in one of the latches in block 1506. As compared with FIG. 14, FIG. 15 illustrates an embodiment in which the NAND (rather than the controller) determines whether data i is already located in one of the latches. If i is not stored in one of the latches, then the controller sends a command to sense the location of i' from the NAND to the latch in block 1508. In other words, the sense operation is performed for determining the sense location i' when data i is not already in one of the latches.

As described, the sense is decoupled from the transfer. In block 1508, when a sense operation is received and the data is not ready in the NAND, the NAND may signal to the controller whether the controller is ready to continue either following the sense initiation or after the sense completion. In the former case, the NAND may be responsible for blocking the controller once a transfer is received, while the data is not yet ready in the latch and the sense operation is not completed. There are several embodiments for the blocking, including busy signaling, blocking of a clock that streams data from the NAND to the controller, and/or a status indication of data readiness in the latch.

If the controller determines that the data i is already in one of the latches, then the controller initiates the transfer of data i from the latch to the controller as in block 1510 when the data is ready. In other words, the sense operation is not performed when data i is already in one of the latches and the transfer operation is performed to transfer from the latch to the controller while the sense operation is skipped.

FIG. 16 is a flow chart of another NAND based embodiment for transferring of data using latches as cache. FIG. 16 is an alternative embodiment to FIG. 15 in which the data is cached in an auxiliary latch for future use. In block 1602, a read command is issued from the controller for reading data i from location i'. In block 1604, the controller issues a sense command for i from location i' for transferring to the controller. The sense and transfer may be two separate operations that can be decoupled from the controller's point of view, in that they can be sent at different times. The NAND determines if i is stored in one of the latches in block 1606. FIG. 16 illustrates an embodiment in which the NAND determines whether data i is already located in one of the latches. If i is not stored in one of the latches, then the controller sends a command to sense the location of i' from the NAND to the latch in block 1608. In other words, the sense operation is performed for determining the sense location i' when data i is not already in one of the latches.

As described, the sense is decoupled from the transfer. In block 1608, when a sense operation is received and the data is not ready in the NAND, the NAND may signal to the controller whether the controller is ready to continue either following the sense initiation or after the sense completion. In the former case, the NAND may be responsible for blocking the controller once a transfer is received, while the data is not yet ready in the latch and the sense operation is not completed. There are several embodiments for the blocking, including busy signaling, blocking of a clock that streams data from the NAND to the controller, and/or a status indication of data readiness in the latch.

If the controller determines that the data i is already in one of the latches, then the controller initiates the transfer of data i from the latch to the controller as in block 1610. In other words, the sense operation is not performed when data i is already in one of the latches and the transfer operation is performed to transfer from the latch to the controller while the sense operation is skipped. In block 1612, the data i is cached by the NAND in an auxiliary latch or the transfer data latch (e.g. X, A, B, or C in FIG. 3B). The caching to the auxiliary latch may be used so that in future usage or future read commands, the sense operation may be skipped because the data i is already located in one of the latches, which would satisfy block 1606 for skipping the sensing of block 1608.

The NAND based data transfer shown in FIGS. 15-16 may be performed by the caching logic 306 of the NVM 104 shown in FIG. 3B. In particular, the caching logic 306 may determine whether data is already stored in the latches and determine whether the sense operation can be skipped for must be performed as shown in FIGS. 15-16. Likewise, the caching logic 306 of FIG. 3B may store data in a latch (i.e. using the latch as a cache) for future requests, such that the sensing operation may be skipped for that data which is already stored in an latch.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), phase-change memory ("PCM"), or other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A memory system comprising:
   a controller;
   non-volatile memory coupled with the controller, wherein the non-volatile memory further comprises:
     a non-volatile memory array comprising a plurality of dies;
     latches that are located on the dies; and
     latch management circuitry that dynamically identifies any one of the plurality dies as a leader die, wherein:
       any of the plurality of dies can be identified as the leader die, and
       the leader die performs a data transfer to or from one or more latches from one of the dies.

2. The memory system of claim 1, wherein the data transfer comprises writing to the one or more latches when the leader die detects a write operation.

3. The memory system of claim 1, wherein the data transfer comprises reading from the one or more latches when the leader die detects a read operation.

4. The memory system of claim 1, wherein the leader die sends a busy signal to the controller for the data transfer.

5. The memory system of claim 1, wherein the latch management circuitry utilizes a suspend and resume commands, wherein a partial release command results in a faster bus response and a full release command results in a slower bus response.

6. The memory system of claim 1, wherein the leader die is one of a plurality of the die that are connected to a same bus or channel and the leader die is a leader for each of the die connected to the same bus or channel.

7. The memory system of claim 1, wherein the non-volatile memory further comprises:
   a first memory bus connecting at least a portion of the dies;
   a second memory bus connecting at least a different portion of the dies; and
   a bridge connecting the first memory bus and the second memory bus.

8. The memory system of claim 7, wherein the leader die is a leader of both the at least a portion of the dies, and the at least a different portion of the dies.

9. The memory system of claim 7, wherein transactions are run in parallel for the portion of the dies and for the different portion of the dies.

10. The memory system of claim 1, wherein the non-volatile memory further comprises:
    a first memory bus connecting at least a portion of the dies;
    a second memory bus connecting at least a different portion of the dies;
    a first bridge coupled with the first memory bus; and
    a second bridge coupled with the second memory bus, wherein the first bridge and the second bridge are connected.

11. The memory system of claim 10, wherein the leader die is a leader of the at least a portion of the dies, and a second leader die from the at least a different portion of the dies is a leader of the at least a different portion of the dies.

12. The memory system of claim 10, wherein transactions are run in parallel for the portion of the dies and for the different portion of the dies.

13. The memory system of claim 1, wherein the leader die is loaded with a sequence of operations that the leader die can run.

14. The memory system of claim 13, wherein the sequence of operations comprises a garbage collection operation between different die located on a same bus that is managed by the leader die without the controller.

15. The memory system of claim 1, wherein the identification of the leader die is caused by an external event or is caused by the controller.

16. A memory system comprising:
    a controller;
    a non-volatile memory coupled with the controller, the non-volatile memory comprising:
      a plurality of memory dies,
        wherein each of the memory dies comprises: cache storage for storing data, and
        any one of the memory dies can be dynamically identified as a leader die; and
      caching logic circuitry configured to be used by the leader die to:
        manage a subset of the cache storage for a subset of the memory dies, wherein the subset of the memory dies are connected with the leader die, and
        dynamically identify a cache storage of the subset of the cache storage to use for a data transfer, wherein any cache storage of the subset of the cache storage can be chosen for data transfer.

17. The memory system of claim 16, wherein each of the cache storage comprises latches and the data transfer comprises:
    writing to the latches from the subset of the memory dies when the leader die detects a write operation, and
    reading from the latches from the subset of the memory dies when the leader die detects a read operation.

18. The memory system of claim 16, wherein the subset of the memory dies comprises all dies connected to a same bus or channel and the leader die is connected to the same bus or channel.

19. The memory system of claim 16, wherein the subset of the memory dies comprises:

a first group of dies and a second group of dies, the second group of dies separate from the first group of dies;
a first memory bus connecting the first group of dies;
a second memory bus connecting the second group of dies; and
a bridge connecting the first memory bus and the second memory bus, wherein the leader die is a leader of both the first group of dies and the second group of dies.

20. The memory system of claim 16, wherein the subset of the memory dies comprises:
a first group of dies and a second group of dies, the second group of dies separate from the first group of dies;
a first memory bus connecting the first group of dies;
a second memory bus connecting the second group of dies;
a first bridge coupled with the first memory bus; and
a second bridge coupled with the second memory bus, wherein the first bridge and the second bridge are connected, wherein the leader die is a leader of both the first group of dies and the second group of dies.

21. The memory system of claim 16, wherein the leader die includes a sequencer for completing a sequence of operations.

22. A memory device with a controller and NAND memory, the device comprising:
means for dynamically identifying any one of a plurality of dies in the NAND memory as a leader die, wherein any of the plurality of dies can be identified as the leader die;
means for receiving a command that includes a data transfer to or from one or more latches of the plurality of dies in the NAND memory; and
means for the leader die to manage the data transfer.

* * * * *